United States Patent
Hu et al.

(10) Patent No.: US 12,490,261 B2
(45) Date of Patent: Dec. 2, 2025

(54) SCHEDULING METHOD AND APPARATUS, DEVICE AND STORAGE MEDIUM

(71) Applicant: ZTE CORPORATION, Shenzhen (CN)

(72) Inventors: Youjun Hu, Shenzhen (CN); Bo Dai, Shenzhen (CN); Luanjian Bian, Shenzhen (CN); Huiying Fang, Shenzhen (CN); Weiwei Yang, Shenzhen (CN); Kun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 709 days.

(21) Appl. No.: 17/790,482

(22) PCT Filed: Dec. 30, 2020

(86) PCT No.: PCT/CN2020/141690
§ 371 (c)(1),
(2) Date: Jun. 30, 2022

(87) PCT Pub. No.: WO2021/136441
PCT Pub. Date: Jul. 8, 2021

(65) Prior Publication Data
US 2023/0139311 A1 May 4, 2023

(30) Foreign Application Priority Data
Dec. 31, 2019 (CN) .......................... 201911418863.X

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0071* (2013.01); *H04L 1/1812* (2013.01);
(Continued)

(58) Field of Classification Search
CPC ............. H04W 72/1273; H04W 72/23; H04W 72/1263; H04W 72/535; H04L 1/0071;
(Continued)

(56) References Cited

U.S. PATENT DOCUMENTS 9,900,903 B1    2/2018   Rottenstreich
10,432,254 B2   10/2019  Takeda
(Continued)

FOREIGN PATENT DOCUMENTS

CN    105897373 A    8/2016
CN    106537979 A    3/2017
(Continued)

OTHER PUBLICATIONS

Search Report for Chinese Application No. 201911418863X, dated Sep. 18, 2023.
(Continued)

*Primary Examiner* — Charles N Appiah
*Assistant Examiner* — Frank E Donado
(74) *Attorney, Agent, or Firm* — Knobbe, Martens, Olson & Bear, LLP

(57) ABSTRACT

Provided are a scheduling method and apparatus, a device and a storage medium. The scheduling method includes, in the case where multiple transport blocks (TBs) are scheduled in one PDCCH, determining the order of multiple TBs and the narrowband position of each TB according to a predefined rule. The predefined rule includes at least a predefined frequency hopping rule or a predefined interleaving rule.

18 Claims, 5 Drawing Sheets

The frequency hopping granularity is 4

The frequency hopping granularity is 8

TB1    TB2    TB3    TB4

(51) Int. Cl.
*H04L 1/1812* (2023.01)
*H04L 5/00* (2006.01)
*H04L 5/14* (2006.01)
*H04W 72/23* (2023.01)

(52) U.S. Cl.
CPC .......... *H04L 5/0012* (2013.01); *H04L 5/1469* (2013.01); *H04W 72/23* (2023.01)

(58) Field of Classification Search
CPC ... H04L 1/1812; H04L 5/0012; H04L 5/1469; H04L 5/0044; H04L 5/0053; H04L 5/0055; H04L 1/1822; H04B 2201/71323; H04B 1/713
See application file for complete search history.

(56) References Cited

U.S. PATENT DOCUMENTS

| | | | |
|---|---|---|---|
| 2012/0218882 | A1 | 8/2012 | Ko et al. |
| 2018/0006791 | A1* | 1/2018 | Marinier ........... H04W 52/0216 |
| 2018/0270807 | A1* | 9/2018 | Salem ............... H04W 72/0446 |
| 2019/0059057 | A1 | 2/2019 | Peng et al. |
| 2020/0195370 | A1* | 6/2020 | Li ........................ H04L 1/0009 |
| 2021/0051636 | A1* | 2/2021 | Sengupta ............... H04B 1/713 |
| 2021/0344448 | A1* | 11/2021 | Nogami ................ H04L 1/1887 |
| 2024/0205934 | A1* | 6/2024 | Zhou ..................... H04L 1/1822 |

FOREIGN PATENT DOCUMENTS

| | | | |
|---|---|---|---|
| CN | 107925468 A | | 4/2018 |
| CN | 108886805 A | | 11/2018 |
| CN | 109565661 A | | 4/2019 |
| CN | 110535556 A | | 12/2019 |
| CN | 110535610 A | | 12/2019 |
| CN | 110536462 A | | 12/2019 |
| CN | 111092634 A | | 5/2020 |
| WO | WO 2011/082573 A1 | | 7/2011 |
| WO | WO 2012/139465 A1 | | 10/2012 |

OTHER PUBLICATIONS

Second Office Action for Chinese Application No. 201911418863.X, dated Sep. 28, 2023.
R1-1911919 "Scheduling of multiple transport blocks": 7 3GPP, (Scheduling of multiple transport blocks)/TI; Semantic ranking, semantic benchmark: 201911418863X., Nov. 18-22, 2019.
Chinese First Search Report for Chinese Patent Application No. 201911418863X dated Feb. 14, 2023.
Chinese First Office Action for Chinese Patent Application No. 201911418863.X dated Mar. 1, 2023.
Feb. 25, 2021 International Search Report for PCT/CN2020/141690 (4 pages).
Huawei, HiSilicon, "Scheduling of multiple transport blocks", 3GPP TSG RAN WG1 Meeting #99, Reno, USA, R1-1913403, Nov. 18-22, 2019.
Office Action for Korean Application No. 10-2022-7026406 issued Feb. 10, 2025.
Ericsson, "Feature lead summary for Scheduling of multiple DL/UL transport blocks for LTE-MTC", 3GPP Draft; R1-1913229, 3rd Generation Partnership Project (3GPP), Mobile Competence Centre; 650, Route Des Lucioles; F-06921 Sophia-Antipolis Cedex, France, vol. RAN WG1, No. Reno, USA, Nov. 25, 2019.
Ericsson, "Feature lead summary #2 for Scheduling of multiple DL/UL transport blocks for LTE-MTC", 3GPP Draft; R1-1913371, 3rd Generation Partnership Project (3GPP), Mobile Competence Centre; 650, Route Des Lucioles; F-06921 Sophia-Antipolis Cedex, France, vol. RAN WG1, No. Reno, USA, Nov. 25, 2019.
Qualcomm Incorporated, "Scheduling of multiple DL/UL transport blocks", 3GPP Draft; R1-1809024, $3^{rd}$ Generation partnership Project (3GPP), Mobile Competence Centre; 650, Route Des Lucioles; F-06921 Sophia-Antipolis Cedex, France, vol. RAN WG1, No. Gothenburg, Sweden, Aug. 20, 2018.
Qualcomm Incorporated, "Scheduling of multiple DL/UL transport blocks", 3GPP Draft; R1-1913246, $3^{rd}$ Generation partnership Project (3GPP), Mobile Competence Centre; 650, Route Des Lucioles; F-06921 Sophia-Antipolis Cedex, France, vol. RAN WG1, No. Reno, USA, Nov. 19, 2019.
The Extended European Search Report for European Patent Application No. 20909513.2 dated Jan. 25, 2024.

\* cited by examiner

The interval is 0, and the bundling size for TBs is 2

The interval is 1, and the bundling size for TBs is 2

The interval is 0, and the bundling size for TBs is 4

The interval is 1, and the bundling size for TBs is 4

| The Number of Scheduled TBs / Frequency Hopping Granularity | 1 | 2 | 3 | 4 |
|---|---|---|---|---|
| 2 | None | 2 | 3 | 4 |
| 4 | None | 1 | 3/2 | 2 |
| 8 | None | 1/2 | 3/4 | 1 |
| 16 | None | 1/4 | 3/8 | 1/2 |

| Frequency Hopping Granularity \ The Number of Scheduled TBs | 1 | 2 | 3 | 4 |
|---|---|---|---|---|
| 2 | None | 1 | 3/2 | 2 |
| 4 | None | 1/2 | 3/4 | 1 |
| 8 | None | 2/8 | 3/8 | 4/8 |
| 16 | None | 2/16 | 3/16 | 4/16 |

FIG. 7

| Frequency Hopping Granularity \ The Number of Scheduled TBs | 1 | 2 | 3 | 4 | 5 | 6 | 7 | 8 |
|---|---|---|---|---|---|---|---|---|
| 1 | None | 1 | 3/2 | 2 | 5/2 | 3 | 7/2 | 4 |
| 2 | None | 1/2 | 3/4 | 1 | 5/4 | 3/2 | 7/4 | 2 |
| 4 | None | 1/4 | 3/8 | 1/2 | 5/8 | 6/8 | 7/8 | 1 |
| 8 | None | 1/8 | 3/16 | 1/4 | 5/16 | 6/16 | 7/16 | 1/2 |

FIG. 8

| The Number of Scheduled TBs / Frequency Hopping Granularity | 1 | 2 | 3 | 4 | 5 | 6 | 7 | 8 |
|---|---|---|---|---|---|---|---|---|
| 1 | None | 1/2 | 3/4 | 1 | 5/4 | 6/4 | 7/4 | 2 |
| 2 | None | 2/8 | 3/84 | 1/2 | 5/8 | 6/8 | 7/8 | 1 |
| 4 | None | 1/8 | 3/16 | 1/4 | 5/16 | 6/16 | 7/16 | 1/2 |
| 8 | None | 1/16 | 3/32 | 1/8 | 5/32 | 6/32 | 7/32 | 1/4 |

FIG. 9

SCHEDULING METHOD AND APPARATUS, DEVICE AND STORAGE MEDIUM

CROSS-REFERENCE TO RELATED APPLICATIONS

This is a National Stage Application filed under 35 U.S.C. 371 based on International Patent Application No. PCT/CN2020/141690, filed on Dec. 30, 2020, which claims priority to Chinese Patent Application No. 201911418863.X filed with the China National Intellectual Property Administration (CNIPA) on Dec. 31, 2019, the contents of which are incorporated herein by reference in their entireties.

TECHNICAL FIELD

The present application relates to the field of communication, for example, a scheduling method and apparatus, a device and a storage medium.

BACKGROUND

In the case where frequency hopping technology is used for scheduling multiple transport blocks (TBs), one TB cannot be spanned in all narrowbands, or one TB occupies only one narrowband. As a result, there is the issue that a frequency hopping gain is limited.

SUMMARY

The present application provides a scheduling method and apparatus, a device and a storage medium to improve a frequency hopping gain.

An embodiment of the present application provides a scheduling method. The scheduling method includes the following: in the case where multiple TBs are scheduled in one physical downlink control channel (PDCCH), the order of the TBs and the narrowband position of a TB are determined according to a predefined rule, where the predefined rule includes at least one of the following: a predefined frequency hopping rule or a predefined interleaving rule.

An embodiment of the present application provides a scheduling apparatus. The scheduling apparatus includes a determination module.

The determination module is configured to, in the case where multiple TBs are scheduled in one physical downlink control channel (PDCCH), the order of the TBs and the narrowband position of a TB are determined according to the predefined rule, where the predefined rule includes at least one of the following: a predefined frequency hopping rule or a predefined interleaving rule.

An embodiment of the present application provides a device. The device includes a memory and one or more processors. The memory is configured to store one or more programs. The one or more programs, when executed by the one or more processors, cause the one or more processors to perform the method according to any preceding embodiment.

An embodiment of the present application provides a storage medium. The storage medium stores a computer program which, when executed by a processor, causes a processor to perform the method according to any preceding embodiment.

BRIEF DESCRIPTION OF DRAWINGS

FIG. 7 is a schematic diagram of a table illustrating a relationship between a frequency hopping granularity, a number of scheduled TBs and a number of narrowbands.

FIG. 8 is a schematic diagram of a table illustrating a relationship between a frequency hopping granularity, a number of scheduled TBs and a number of narrowbands.

FIG. 9 is a schematic diagram of a table illustrating a relationship between a frequency hopping granularity, a number of scheduled TBs and a number of narrowbands.

DETAILED DESCRIPTION Embodiments of the present application are described hereinafter in conjunction with drawings.

Figures 1, 2:
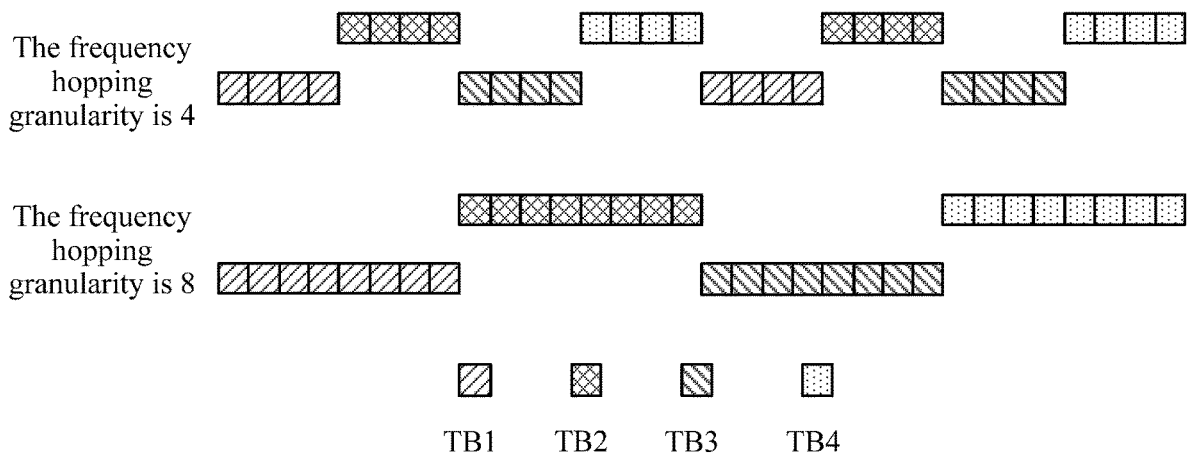
FIG. 1 is a flowchart of a scheduling method according to an embodiment of the present application.
FIG. 2 is a diagram illustrating that one TB occupies only one narrowband according to an embodiment of the present application.

FIG. 1 is a flowchart of a scheduling method according to an embodiment of the present application. This embodiment may be executed by a base station or may be executed by a user equipment (UE) or a relay node. As shown in FIG. 1, the scheduling method in this embodiment includes S110.

In S110, in the case where multiple TBs are scheduled in one PDCCH, the order of the TBs and the narrowband position of a TB are determined according to a predefined rule. The predefined rule includes at least one of the following: a predefined frequency hopping rule or a predefined interleaving rule.

In an embodiment, in the case where multiple TBs are scheduled in one PDCCH, that is, when multi-TB scheduling performs frequency hopping, one TB cannot be spanned in all narrowbands, or one TB can occupy only one narrowband. As a result, the frequency hopping gain is limited.

In an embodiment, according to the predefined frequency hopping rule or the predefined interleaving rule, the order of multiple TBs is adjusted, and the position of a narrowband in which each TB is located is adjusted. In this manner, the object that TBs occupy all narrowbands is achieved. Therefore, the frequency hopping gain is improved.

In an embodiment, the multi-TB scheduling may also be scheduling of multiple codewords or scheduling of multiple shared channels.

In an embodiment, in the case where the predefined rule is the predefined interleaving rule, the order of the TBs is determined according to an interleaving block index.

In an embodiment, that the order of the TBs is determined according to the interleaving block index includes one of the following: the relative positions of all TBs in an interleaving block with an index number c are obtained by shifting the relative positions of all TBs in an interleaving block with an index number c−1; or the relative positions of all TBs in the interleaving block with an index number c are obtained by shifting the relative positions of all TBs in an interleaving block with an index number 0. The shifting refers to a left shift or a right shift of a relative position of each TB in an interleaving block. The unit refers to a shift position unit.

In an embodiment, the unit of the shifting includes one of the following: one TB, two TBs or the number of TBs occupied in one narrowband.

In an embodiment, the relative positions of all TBs in the interleaving block may be shifted according to the interleaving block index and a preset shift position unit. For example, one TB is used as the unit of a left or right shift. Alternatively, at least two TBs are used as the unit of a left or right shift. Alternatively, the number of TBs occupied in one narrowband during the frequency hopping is used as the unit of a left or right shift.

In an embodiment, in the case where the predefined rule is the predefined interleaving rule, that the order of the TBs is determined according to the predefined rule satisfies at least one of the conditions below.

In the case where each TB is spanned in only a unique narrowband, the relative positions of all TBs in the interleaving block are shifted according to the predefined rule. In the case where the total number of narrowbands is 4 and each TB is spanned in 2 narrowbands, the relative positions of all TBs in the interleaving block are shifted according to the predefined rule. In the case where each TB cannot be spanned in all configured narrowbands, the relative positions of all TBs in the interleaving block are shifted according to the predefined rule. In the case where an interleaving granularity, a frequency hopping granularity, the number of scheduled TBs and the number of frequency hopping narrowbands satisfy the following relationship: $G \leq Y_{ch}$, $N_{TB}*G/(N_{band}*Y_{ch})=n$, $n=1,2,3,4$, the relative positions of all TBs in the interleaving block are shifted according to the predefined rule, where G denotes the interleaving granularity, $Y_{ch}$ denotes the frequency hopping granularity, $N_{TB}$ denotes the number of scheduled TBs, and $N_{band}$ denotes the number of frequency hopping narrowbands. In the case where the interleaving granularity, the frequency hopping granularity, the number of scheduled TBs and the number of frequency hopping narrowbands satisfy the following relationship: $N_{TB}*G/(N_{band}*Y_{ch})=n$, $n=1/2,1,2,3,4$, the relative positions of all TBs in the interleaving block are shifted according to the predefined rule, where G denotes the interleaving granularity, $Y_{ch}$ denotes the frequency hopping granularity, $N_{TB}$ denotes the number of scheduled TBs, and $N_{band}$ denotes the number of frequency hopping narrowbands.

In an embodiment, a narrowband in which each TB is spanned may occupy one physical resource block (PRB) or multiple PRBs in a frequency domain. This is not limited in this embodiment.

In an embodiment, N narrowbands in which one TB is spanned means that the number of narrowbands occupied by one TB in the frequency domain or the number of narrowbands in which one TB is spanned in the frequency domain is N. For example, one TB is spanned in two narrowbands, which means that the number of narrowbands occupied by the TB in the frequency domain or the number of narrowbands in which the TB is spanned in the frequency domain is 2.

In an embodiment, in the case where each TB is spanned in only a unique narrowband, the relationship between the interleaving granularity, the frequency hopping granularity, the number of scheduled TBs and the number of frequency hopping narrowbands is as follows:

$$G \leq Y_{ch}, N_{TB}*G/(N_{band}*Y_{ch})=n, n=1,2,3,4$$

G denotes the interleaving granularity, $Y_{ch}$ denotes the frequency hopping granularity, $N_{TB}$ denotes the number of scheduled TBs, and $N_{band}$ denotes the number of frequency hopping narrowbands.

In an embodiment, in the case where the total number of narrowbands is 4 and each TB is spanned in 2 narrowbands, the relationship between the interleaving granularity, the frequency hopping granularity, the number of scheduled TBs and the number of frequency hopping narrowbands is as follows:

$$N_{TB}*G/(N_{band}*Y_{ch})=n, n=1/2,1,2,3,4$$

G denotes the interleaving granularity, $Y_{ch}$ denotes the frequency hopping granularity, $N_{TB}$ denotes the number of scheduled TBs, and $N_{band}$ denotes the number of frequency hopping narrowbands.

In an embodiment, that the relative positions of all the TBs in the interleaving block with the index number c are obtained by shifting the relative positions of all the TBs in the interleaving block with the index number c−1 includes the following:

$$X_{c,r}=\mathrm{mod}(X_{c-1,r} \pm c*\mathrm{shift}, N_{TB})$$

$X_{c-1,r}$ denotes the position number of a TB with a number r in the interleaving block with the index number c−1, and $X_{c,r}$ denotes the position of a TB with a number r in the interleaving block with the index number c.

In an embodiment, that the relative positions of all the TBs in the interleaving block with the index number c are obtained by shifting the relative positions of all the TBs in the interleaving block with the index number 0 includes the following:

$$r'_c=\mathrm{mod}(r \pm c*\mathrm{shift}, N_{TB})$$

c denotes an interleaving block number, r denotes a TB number in the first interleaving block, r also denotes a position number of the TB, $N_{TB}$ denotes the number of scheduled TBs, $r_c'$ denotes the position of a TB with an initial number r in the interleaving block c, and shift denotes the offset value of the shifting.

In an implementation, for the case where the TB occupies one narrowband or cannot occupy all frequency hopping narrowbands, a frequency hopping rule or the order of the TB s in the interleaving block during interleaving may be changed to avoid this case. Therefore, a large frequency hopping gain is obtained.

In the related art, there is the case where the TB occupies one narrowband or cannot occupy all frequency hopping narrowbands in the following cases: first, for mode A with a coverage enhancement (CE), G=1, and $Y_{ch}=\{1, 2, 4, 8\}$ during the frequency hopping; and second, for mode B with the CE, G=4, and $Y_{ch}=\{2, 4, 8, 16\}$ during the frequency hopping.

Figures 5, 6:
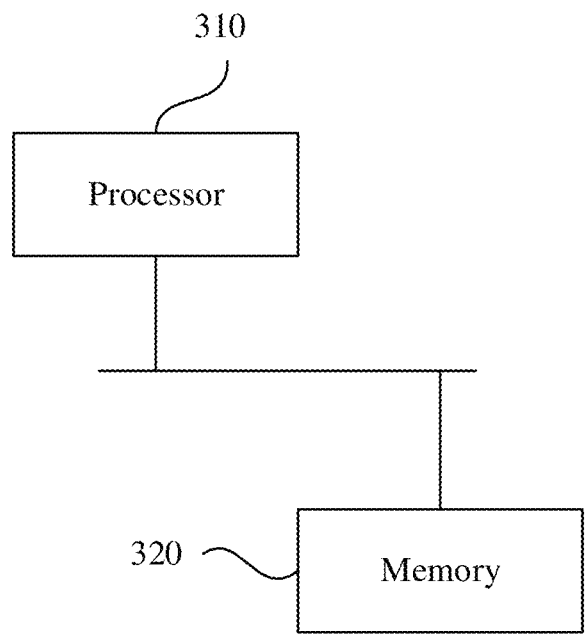
FIG. 5 is a diagram illustrating the structure of a device according to an embodiment of the present application.
FIG. 6 is a schematic diagram of a table illustrating a relationship between a frequency hopping granularity, a number of scheduled TBs and a number of narrowbands.

FIG. 6 is a schematic diagram of a table illustrating a relationship between a frequency hopping granularity, a number of scheduled TBs and a number of narrowbands. FIG. 7 is a schematic diagram of a table illustrating a relationship between a frequency hopping granularity, a number of scheduled TBs and a number of narrowbands. FIG. 8 is a schematic diagram of a table illustrating a relationship between a frequency hopping granularity, a number of scheduled TBs and a number of narrowbands. FIG. 9 is a schematic diagram of a table illustrating a relationship between a frequency hopping granularity, a number of scheduled TBs and a number of narrowbands. In FIGS. 6 to 9, a horizontal bar filler indicates that the TB is spanned in only one narrowband, and a vertical bar filler indicates that the TB is not spanned in all narrowbands (for example, the TB is spanned in 2 narrowbands).

As shown in FIG. 6, in the case where the frequency hopping granularity is 4, and the number of scheduled TBs is 2, n=1; in the case where the frequency hopping granularity is 4, and the number of scheduled TBs is 4, n=2; and in the case where the frequency hopping granularity is 8, and the number of scheduled TBs is 4, n=1. In the preceding three cases, the TB is spanned in only one narrowband.

In a second case, for mode B, the number of frequency hopping narrowbands is 4, and G=4. As shown in FIG. 7, in the case where the frequency hopping granularity is 2, and the number of scheduled TBs is 2, n=1; in the case where the frequency hopping granularity is 4, and the number of scheduled TBs is 2, n=1/2; in the case where the frequency hopping granularity is 2, and the number of scheduled TBs is 4, n=2; and in the case where the frequency hopping granularity is 8, and the number of scheduled TBs is 4, n=4/8. In the preceding four cases, the TB is not spanned in all narrowbands. In the case where the frequency hopping granularity is 4, and the number of scheduled TBs is 4, n=1; and the TB is spanned in only one narrowband.

In a third first case, for mode A, the number of frequency hopping narrowbands is 2, and G=1. As shown in FIG. 8, in the case where the frequency hopping granularity is 1, and the number of scheduled TBs is 2, n=1; in the case where the frequency hopping granularity is 1, and the number of scheduled TBs is 4, n=2; in the case where the frequency hopping granularity is 2, and the number of scheduled TBs is 4, n=1; in the case where the frequency hopping granularity is 1, and the number of scheduled TBs is 6, n=3; in the case where the frequency hopping granularity is 1, and the number of scheduled TBs is 8, n=4; in the case where the frequency hopping granularity is 2, and the number of scheduled TBs is 8, n=2; and in the case where the frequency hopping granularity is 4, and the number of scheduled TBs is 8, n=1. In the preceding seven cases, the TB is spanned in only one narrowband.

In a fourth case, for mode A, the number of frequency hopping narrowbands is 4, and G=1. As shown in FIG. 9, in the case where the frequency hopping granularity is 1, and the number of scheduled TBs is 2, n=1/2; in the case where the frequency hopping granularity is 2, and the number of scheduled TBs is 4, n=1/2; and in the case where the frequency hopping granularity is 4, and the number of scheduled TBs is 8, n=1/2. In the preceding three cases, the TB is not spanned in all narrowbands (that is, the TB is spanned in 2 narrowbands). In the case where the frequency hopping granularity is 1, and the number of scheduled TBs is 4, n=1; and in the case where the frequency hopping granularity is 1, and the number of scheduled TBs is 8, n=2; and in the case where the frequency hopping granularity is 2, and the number of scheduled TBs is 8, n=1. In the preceding two cases, the TB is spanned in only one narrowband.

In an embodiment, according to the predefined rule, all TBs in the interleaving block are cyclically shifted by using one TB as the shift position unit. For the portions filled with horizontal bars in FIGS. 6 to 9, in the case where the relationship between the interleaving granularity, the frequency hopping granularity, the number of scheduled TBs and the number of frequency hopping narrowbands satisfies: $G \leq Y_{ch}$, $N_{TB}*G/(N_{band}*Y_{ch})=n$, $n=1,2,3,4$, an interleaving rule is changed (that is, the order of the TBs is changed) in the following manner $$r'_c = \begin{cases} \mathrm{mod}(r+c, N_{TB}), & C \leq Y_{ch}, N_{TB}*G/(N_{band}*Y_{ch}) = n, n \in \{1, 2, 3, 4\} \\ r, & \text{others} \end{cases}$$

G denotes the interleaving granularity, $Y_{ch}$ denotes the frequency hopping granularity, $N_{TB}$ denotes the number of scheduled TBs, $N_{band}$ denotes the number of frequency hopping narrowbands, c denotes the interleaving block number, r denotes the TB number in the first interleaving block, r also denotes the position number, $r_c'$ denotes the position of the TB with the initial number r in the interleaving block c.

For the case where the portions filled with the horizontal bars and the portions filled with the vertical bars are included in preceding FIGS. 6 to 9, two implementations below are included.

In one implementation, in the case where the number of narrowbands is 4, and the relationship between the interleaving granularity, the frequency hopping granularity, the number of scheduled TBs and the number of frequency hopping narrowbands satisfies: $N_{TB}*G/(N_{band}*Y_{ch})=n$, n=1/2,1,2,3,4, the interleaving rule is changed (that is, the order of the TBs is changed) in the following manner $$r'_c = \begin{cases} \mathrm{mod}(r+c, N_{TB}), & N_{TB}*G/(N_{band}*Y_{ch}) = n, n \in \{1/2, 1, 2, 3, 4\} \\ r, & \text{others} \end{cases}$$

G denotes the interleaving granularity, $Y_{ch}$ denotes the frequency hopping granularity, $N_{TB}$ denotes the number of scheduled TBs, $N_{band}$ denotes the number of frequency hopping narrowbands, c denotes the interleaving block number, r denotes the TB number in the first interleaving block, r also denotes the position number, and $r_c'$ denotes the position of the TB with the initial number r in the interleaving block c.

In another implementation, in the case where the number of narrowbands is 2, and the relationship between the interleaving granularity, the frequency hopping granularity, the number of scheduled TBs and the number of frequency hopping narrowbands satisfies: $G \leq Y_{ch}$, $N_{TB}*G/(N_{band}*Y_{ch})=n$, n=1,2,3,4, the interleaving rule is changed (that is, the order of the TBs is changed) in the following manner $$r'_c = \begin{cases} \mathrm{mod}(r+c, N_{TB}), & C \leq Y_{ch}, N_{TB}*G/(N_{band}*Y_{ch}) = n, n \in \{1, 2, 3, 4\} \\ r, & \text{others} \end{cases}$$

G denotes the interleaving granularity, $Y_{ch}$ denotes the frequency hopping granularity, $N_{TB}$ denotes the number of scheduled TBs, $N_{band}$ denotes the number of frequency hopping narrowbands, c denotes the interleaving block number, r denotes the TB number in the first interleaving block, r also denotes the position number, and $r_c'$ denotes the position of the TB with the initial number r in the interleaving block c.

In an embodiment, according to the predefined rule, all TBS in the interleaving block are cyclically shifted by using at least two TBs as the shift position unit. For the portions filled with the horizontal bars in FIGS. 6 to 9, in the case where the relationship between the interleaving granularity, the frequency hopping granularity, the number of scheduled TBs and the number of frequency hopping narrowbands satisfies: $G \leq Y_{ch}$, $N_{TB}*G/(N_{band}*Y_{ah})=n$, n=1,2,3,4 , the interleaving rule is changed (that is, the order of the TBs order is changed) in the following manner:

$$r'_c = \begin{cases} \mathrm{mod}\left(r + c * \dfrac{Y_{ch}}{G}, N_{TB}\right), & C \le Y_{ch}, N_{TB} * G/(N_{band} * Y_{ch}) = n, n \in \{1, 2, 3, 4\} \\ r, & \text{others} \end{cases}$$

G denotes the interleaving granularity, $Y_{ch}$ denotes the frequency hopping granularity, $N_{TB}$ denotes the number of scheduled TBs, $N_{band}$ denotes the number of frequency hopping narrowbands, c denotes the interleaving block number, r denotes the TB number in the first interleaving block, r also denotes the position number, and $r_c'$ denotes the position of the TB with the initial number r in the interleaving block c.

For the case where the portions filled with the horizontal bars and the portions filled with the vertical bars are included in preceding FIGS. 6 to 9, the implementations below are included.

In one implementation, in the case where the number of narrowbands is 4, and the relationship between the interleaving granularity, the frequency hopping granularity, the number of scheduled TBs and the number of frequency hopping narrowbands satisfies: $N_{TB}*G/(N_{band}*Y_{ch})=n$, n=1/2,1,2,3,4, the interleaving rule is changed (that is, the order of the TBs is changed) in the following manner $$r'_c = \begin{cases} \mathrm{mod}\left(r + c * \dfrac{Y_{ch}}{G}, N_{TB}\right), & C \le Y_{ch}, N_{TB} * G/(N_{band} * Y_{ch}) = n, n \in \{1/2, 1, 2, 3, 4\} \\ \mathrm{mod}\left(r + c * \dfrac{G}{Y_{ch}}, N_{TB}\right), & C \le Y_{ch}, N_{TB} * G/(N_{band} * Y_{ch}) = n, n \in \{1/2, 1, 2, 3, 4\} \\ r, & \text{others} \end{cases}$$

G denotes the interleaving granularity, $Y_{ch}$ denotes the frequency hopping granularity, $N_{TB}$ denotes the number of scheduled TBs, $N_{band}$ denotes the number of frequency hopping narrowbands, c denotes the interleaving block number, r denotes the TB number in the first interleaving block, r also denotes the position number, and $r_c'$ denotes the position of the TB with the initial number r in the interleaving block c.

The preceding implementations of changing the interleaving rule may be described as: when a trigger condition is satisfied, an interleaving order is changed, which may be implemented by a cyclic shift. A shift manner is to shift the interleaving order of the TBs. When the trigger condition is not satisfied, the interleaving order is the order of the TBs from small to large. For example, when the TB numbers are 0 and 1, the interleaving order of the cyclic shift is TB0TB1TB0TB1TB0TB1. When the trigger condition is satisfied, the interleaving order of the cyclic shift is not TB0TB 1. For example, the interleaving order of the cyclic shift may be TB0TB1TB1TB0.

The cyclic shift of the TBs includes shifting one TB at a time, shifting multiple TBs at a time or shifting the TB on one narrowband at a time. In an embodiment, the unit of the cyclic shift is based on a TB. For example, the shift of one TB means that the position of each TB in the interleaving block is shifted by one TB (interleaving granularity*TB length, the TB length may be described by the total slots or subframes of one TB).

In an embodiment, the cyclic shift of the TBs may be left or right. In this embodiment, the left shift is defined as the increase of the TB number at the same position in the next interleaving block. The right shift is defined as the reduction of the TB number at the same position in the next interleaving block. The preceding formulas involve the left shift. The preceding formulas may also be changed to involve the right shift. In the case where an interleaving order change trigger condition is satisfied, the left shift may be described as: $r'_c = \mathrm{mod}(r+\mathrm{shift}, N_{TB})$, and the right shift may be described as: $r'_c = \mathrm{mod}(r-\mathrm{shift}, N_{TB})$.

In an embodiment, in the case where a condition for triggering the change of the interleaving order is satisfied, the position of $TB_r$ in the interleaving block c is set to $X_{c,r}$; the number of TBs is set to $N_{TB}$; and the value range of the position $X_{c,r}$ is set to $[0, N_{TB}-1]$. The position of $TB_r$ in the interleaving block c satisfies: $X_{c,r}=\mathrm{mod}(X_{c-1,r}-1, N_{TB})$. The number of narrowbands is set to $N_{band}$. Then the narrowband position of $TB_r$ is P, and the range is $[0, N_{TB}-1]$. The following formulas are satisfied:

$$P_{left} = \mathrm{mod}\left(\left\lfloor \dfrac{G \cdot N_{TB} \cdot c + G \cdot X_{c,r}}{Y_{ch}} \right\rfloor, N_{band}\right)$$

$$P_{right} = \mathrm{mod}\left(\left\lfloor \dfrac{G \cdot N_{TB} \cdot c + G \cdot X_{c,r} + G - 1}{Y_{ch}} \right\rfloor, N_{band}\right)$$

A representation may also be made in another manner $$P = \mathrm{mod}\left(\left\lfloor \dfrac{G \cdot N_{TB} \cdot c + G \cdot X_{c,r} + l}{Y_{ch}} \right\rfloor, N_{band}\right)$$

$P_{left}$ denotes the number of narrowbands occupied by a TB performing a cyclic left shift, $P_{right}$ denotes the number of narrowbands occupied by a TB performing a cyclic right shift, $l=0,1,\ldots g-1$, $c=0,1,\ldots N_{Rep}/C-1$, $g=C\,N_{RU}N_{slots}^{UL}$, or g=C, where C=G.

In an embodiment, in the case where P has only one value, it is indicated that each TB is on only one narrowband. At this time, if the number of interleaving blocks is larger than or equal to the number of narrowbands, the shift of the interleaving order is performed.

Alternatively, in the case where the number of narrowbands is 4, and P has 2 values, if the number of interleaving blocks is larger than or equal to the number of narrowbands, it is indicated that each TB is spanned in only two narrowbands, and at this time, the shift of the interleaving order is performed.

Alternatively, the position of $TB_r$ in the interleaving block c may satisfy:

$$X_{c,r} = \mathrm{mod}(X_{c-1,r}+1, N_{TB}), \; X_{c,r} = \mathrm{mod}\left(X_{c-1,r} \pm \dfrac{Y_{ch}}{G}, N_{TB}\right),$$

$$X_{c,r} = \mathrm{mod}\left(X_{c-1,r} \pm \dfrac{G}{Y_{ch}}, N_{TB}\right) \text{ or } X_{c,r} = X_{c-1,r}.$$

In an embodiment, when the condition for changing the interleaving order is satisfied, the interleaving order may be described as: $r'_c=\text{mod}(r\pm\text{shift}, N_{TB})$, $X_{c,r}=\text{mod}(X_{c-1,r}\pm\text{shift}, N_{TB})$, $r'_c=\text{mod}(r\pm c^*\text{shift}, N_{TB})$ or $X_{c,r}=\text{mod}(X_{c-1,r}\pm c^*\text{shift}, N_{TB})$. In an embodiment, only in the case where a trigger condition (that is, the condition for changing the interleaving order) is satisfied, the interleaving order is changed. For the scheduling that does not satisfy the trigger condition, the interleaving order is not changed. In an embodiment, the preceding shift is a separate formula, and the value of shift includes at least one of the following: 1 or $G/Y_{ch}$.

In an embodiment, the trigger condition (that is, the condition for changing the interleaving order) may be written into a formula, that is, this formula is used for enabling the interleaving order to be cyclically shifted in some scenarios. This formula may be expressed as one of the following: $r'_c=\text{mod}(r\pm\text{shift}, N_{TB})$, $X_{c,r}=\text{mod}(X_{c-1,r}\pm\text{shift}, N_{TB})$ $r'_c=\text{mod}(r\pm c^*\text{shift}, N_{TB})$ or $X_{c,r}=\text{mod}(X_{c-1,r}^*\text{shift}, N_{TB})$. In an embodiment, in the case where an initial offset value exists, a parameter offset may be set, and the parameter includes at least one of the following:

$X_{c,r}=\text{mod}(X_{c-1,r}\pm c^*\text{shift}+\text{offset}, N_{TB})$ $X_{c,r}=\text{mod}(X_{c-1,r}\pm c^*\text{shift}, N_{TB})+\text{offset}$ $r'_c=\text{mod}(r\pm c^*\text{shift}+\text{offset}, N_{TB})$ $r'_c=\text{mod}(r\pm c^*\text{shift}, N_{TB})+\text{offset}$ In this embodiment, offset denotes the initial value of the offset, and the determination manner of offset includes one of the following: predefinition, base station configuration, radio resource control (RRC) signaling configuration or other signaling instructions. The preceeding shift denotes the offset value of the shifting, and the value of shift includes at least one of the following: 0, 1 or $G/Y_{ch}$.

In an embodiment, in the case where the predefined rule is the predefined frequency hopping rule, the frequency hopping granularity includes one of the following: a predefined value or a downlink control information (DCI) indication value.

In an embodiment, in the case where the frequency hopping granularity is the DCI indication value, 2 bits are used for indication. The 2 bits are used for indicating that the frequency hopping is not enabled or indicating 3 values of the frequency hopping granularity.

Alternatively, 1 bit is used for indication. The 1 bit is used for indicating 2 values of the frequency hopping granularity.

In an embodiment, in the case where the frequency hopping granularity is the predefined value, the value of the predefined value includes at least one of $\{1, 2, 4, 8\}$. The unit of the frequency hopping granularity includes one of the following: one interleaving block, $N_{TB}$ subframes, a product of the interleaving granularity, the number of resource units (RUs) and the number of slots occupied by each RU; a product of $N_{TB}$, the number of RUs and the number of slots occupied by each RU; a product of the number of RUs and the number of slots occupied by each RU; one RU; or one subframe. In this embodiment, that the value of the predefined value includes at least one of $\{1, 2, 4, 8\}$ means that the frequency hopping granularity $Y_{ch}$ includes at least one of 1, 2, 4, 8, that is, $Y_{ch}$ interleaving blocks perform the frequency hopping again.

In an implementation, in the case where the predefined rule is the predefined frequency hopping rule, the configuration manner of the frequency hopping granularity includes one of the following: the predefined value or the DCI indication value. In an embodiment, in the case where the order of multiple TBs and the narrowband position of the TB are determined according to the preset hopping granularity rule, the frequency hopping granularity may be the predefined value or may be the DCI indication value.

In an embodiment, in the case where the frequency hopping granularity is the predefined value, the value of the predefined value includes at least one of $\{1, 2, 4, 8\}$. The unit of the frequency hopping granularity includes one of the following: one interleaving block; a product of the interleaving granularity, the number of RUs or the number of subframes and the number of slots or subframes occupied by each RU respectively; a product of the number of RUs or subframes allocated to a transmission block and the number of slots or subframes occupied by each RU respectively; one RU; or one subframe. In an embodiment, the implementations below are included.

In an implementation, the frequency hopping granularity is the predefined value. In the case where the unit of the frequency hopping granularity is one interleaving block, the value of the predefined value is set to be at least one of $\{1, 2, 4, 8\}$.

In an implementation, the frequency hopping granularity is the predefined value. The unit of the frequency hopping granularity is one $G^*N_{RU}N_{slot}$, that is, $G^*$the number of RUs*the number of slots occupied by each RU. G denotes the interleaving granularity. Alternatively, the value of G is 4. The value of $G^*N_{RU}N_{slot}$ is set to be at least one of $\{1, 2, 4, 8\}$.

In an implementation, the frequency hopping granularity is the predefined value. The unit of the frequency hopping granularity is $N_{RU}N_{slot}$. The value of $N_{RU}N_{slot}$ is set to be at least one of $\{1, 2, 4, 8\}$.

In an implementation, the frequency hopping granularity is the predefined value. The unit of the frequency hopping granularity is one RU. The value of the RU is set to be at least one of $\{1, 2, 4, 8\}$.

In an implementation, the frequency hopping granularity is the predefined value. The unit of the frequency hopping granularity is one subframe. The value of the subframe is set to be at least one of $\{1, 2, 4, 8\}$.

In an embodiment, the frequency hopping granularity is $M^*U$. U denotes the granularity that the frequency hopping granularity is based on. U may be a subframe, an RU, one TB and 4 repeated TBs or interleaving blocks. M is set to be at least one of $\{1, 2, 4, 8\}$ and may further include 13, 32, 64 and other powers of 2. Alternatively, M is configured by a higher layer. Alternatively, M takes the predefined value. In an embodiment, the same implementation manner or different implementation manners may be used for U when interleaving and non-interleaving are enabled. In an embodiment, the frequency hopping granularity based on the interleaving block and $G^*N_{RU}N_{slot}$ may be used for the frequency hopping in the case of interleaving.

In an embodiment, in the case where the configuration manner of the frequency hopping granularity is the DCI indication value, 2 bits are used for indication. The 2 bits are used for indicating that the frequency hopping is not enabled or indicating 3 values of the frequency hopping granularity. Alternatively, 1 bit is used for indicating 2 values of the frequency hopping granularity. In this embodiment, the implementations below are included.

In an implementation, the DCI indication value includes 1 bit used for indicating the frequency hopping granularity at this time. In the case where the DCI indication value that is used for indicating the frequency hopping granularity exists, it is indicated that the frequency hopping is enabled, the bit may be 0 or 1, and the frequency hopping granularity is S1. Alternatively, in the case where the bit is 1 or 0, it is indicated that the frequency hopping granularity is S2. Alternatively, in the case where the frequency hopping granularity is configured by a higher-layer signaling, one state of 1 bit in DCI is used for indicating that the frequency hopping is not enabled, another state is used for indicating that the frequency hopping is enabled, and there is one corresponding frequency hopping granularity.

In an implementation, the DCI indication value includes 2 bits used for indicating the frequency hopping granularity at this time and used for the indication of the frequency hopping. The DCI indication value includes four values: 00, 01, 10 and 11. One of the values indicates that the frequency hopping is not enabled, and three of the values indicate the granularity of the frequency hopping and include at least one of the following: 1, 2 or 4.

In an implementation, the DCI indication value includes 2 bits used for indicating the frequency hopping granularity at this time. In the case where the DCI indication value that is used for indicating the frequency hopping granularity exists, it is indicated that the frequency hopping is enabled. In the case where the 2 bits are 00, 01, 10 and 11, the frequency hopping granularity is S1, S2, S3 and S4 respectively. Alternatively, in the case where the frequency hopping granularity is configured by the higher-layer signaling, the DCI indication value includes 2 bits. One state is used for indicating not enabling, and the remaining three states are used for indicating that the frequency hopping granularity is S1, S2 and S3 during enabling.

In an embodiment, in the case where the frequency hopping is enabled, and the multi-TB scheduling is supported, if one TB occupies only one frequency domain position, or one TB cannot be spanned in all allocated frequency domain positions, the DCI indication value may be used for indicating another granularity or indicating that the frequency hopping is not enabled; or the actual frequency hopping granularity is a multiple of $Y_{ch}=4$: {1/2, 1/4, 1/N, 2, 4}, where N is a positive integer; or when the interleaving is enabled, the interleaving order may be changed.

In an embodiment, in the case where the interleaving order does not need to be changed, the sequential cycle is performed according to the order of the TBs. However, under different frequency hopping granularities, it is still possible that one TB occupying only one narrowband exists in each of the interleaving scenario and the non-interleaving scenario. FIG. 2 is a diagram illustrating that one TB occupies only one narrowband according to an embodiment of the present application. As shown in FIG. 2, in the case where the frequency hopping granularity is 4, each of TB1, TB2, TB3 and TB4 occupies one narrowband; and in the case where the frequency hopping granularity is 8, each of TB1, TB2, TB3 and TB4 also occupies one narrowband.

In an embodiment, in the case where multiple TBs are scheduled in the DCI, and $G=Y_{ch}$ or $R=Y_{ch}$, there is the case where one TB is spanned in only one narrowband, which may be avoided in the manner of changing the frequency hopping granularity or in the manner of changing the indication manner of the DCI indication value. In the case where the frequency hopping granularity configured by the RRC signaling or the higher layer is $Y_{ch}$, and $G=Y_{ch}$ during interleaving, or $R=Y_{ch}$ during non-interleaving, the frequency hopping granularity is default to be N times of an original frequency hopping granularity. N is at least one of the following: {1/2, 1/4, 1/N, 2, 4, C}, where $N_{band}$ denotes the number of narrowbands, C denotes the ratio of the number of narrowbands occupied by one TB to the number of configured narrowbands, and C is at least one of the following: 1/2 or 1/4.

In an implementation, the frequency hopping at two frequency domain positions is supported, and the frequency hopping granularity is $Y_{ch}$.

The two frequency domain positions may be two PRBs or two carriers. Alternatively, each position may include 2 PRBs (that is, two PRBs). Alternatively, each frequency domain position may be one narrowband or may be another unit for describing the frequency domain.

In the case where the interleaving granularity is 4 repeated TBs, a frequency hopping granularity unit and an interleaving granularity unit are the same.

If the scheduling of at most 2 TBs or 4 TBs is supported, then in the case where 2 TBs are interleaved, if $Y_{ch}=1$ or 2, there may not be the case where only one narrowband is occupied; in the case where $Y_{ch}=4$, there may be the case where one TB occupies only one narrowband; and in the case where $Y_{ch}\geq 8$, there may not be the case where one TB occupies one narrowband.

For the case where the maximum number of scheduled TBs is 2, and the interleaving and the frequency hopping at 2 frequency domain positions are configured, in the case where the interleaving granularity is 4 repeated TBs, the frequency hopping granularity is 1 or 2 repeated TBs; and in the case where the interleaving granularity is 1 repeated TB, the frequency hopping granularity is 2 repeated TBs. In this embodiment, for ease of design, the frequency hopping granularity may be configured to be 2 repeated TBs.

For the case where the maximum number of scheduled TBs is 4, and the interleaving and the frequency hopping at 2 frequency domain positions are configured, in the case where the interleaving granularity is 4 repeated TBs, the frequency hopping granularity may be configured to be 1 or 2 repeated TBs, or 8 or more repeated TBs. When the interleaving granularity is 1 repeated TB, the frequency hopping granularity is 4 repeated TBs and more repeated TBs or $N_{TB}$ repeated TBs to avoid the case where one TB is spanned in only one narrowband.

In this embodiment, for the case where the maximum number of scheduled TBs is 2 or 4, and the interleaving and the frequency hopping at 2 frequency domain positions are configured, when the interleaving granularity is 4 repeated TBs (that is, multiple frequency points of the downlink and uplink of a narrowband (NB)), the frequency hopping granularity is 1 or 2 repeated TBs (in an embodiment, the frequency hopping granularity is 2 repeated TBs); when the interleaving granularity is 1 repeated TB (that is, a single frequency point), the frequency hopping granularity is configured to be 2 or 4 repeated TBs. For the case where the maximum number of scheduled TBs is 2, the frequency hopping granularity may be configured to be 2 repeated TBs. For the case where the maximum number of scheduled TBs is 4, the frequency hopping granularity is configured to be 4 repeated TBs.

In the case where the frequency hopping granularity is configured to be $Y_{ch}=4$, there is the case where one TB occupies one narrowband. At this time, the DCI may be used for indicating another granularity or indicating that the frequency hopping is not enabled to avoid this case. Alternatively, the actual frequency hopping granularity is a multiple of $Y_{ch}=4$: {1/2, 1/4, 1/N, 1/$N_{band}$, 2, 4, C}, to avoid this case. Alternatively, the interleaving order is changed to avoid this case, that is, a sequential cycle according to 01010101 . . . . is changed to a sequential cycle according to 01100110 . . . . Alternatively, it is described by the preceding formula. In an embodiment, the frequency hopping granularity may be configured to be at least one of {1, 2, 4, 8, 16}.

In an implementation, if the scheduling of at most 4 TBs is supported, and in the case where 4 TBs are interleaved, if $Y_{ch}=4$ or $Y_{ch}=8$, there may be the case where one TB occupies one narrowband. At this time, the DCI may be used for indicating another granularity or indicating that the frequency hopping is not enabled to avoid this case. Alternatively, the actual frequency hopping granularity is a multiple of $Y_{ch}$: {1/2, 1/4, 1/$N_{band}$, 2, 4, C}, to avoid this case. Alternatively, the interleaving order is changed to avoid this case. In an embodiment, the frequency hopping granularity may be configured to be at least one of {1, 2, 4, 8, 16}.

In an implementation, the frequency hopping at three frequency domain positions is supported, and the frequency hopping granularity is $Y_{ch}$. The frequency hopping granularity may be configured to be at least one of {1, 2, 4, 8, 16}.

In an implementation, the frequency hopping at four frequency domain positions is supported, and the frequency hopping granularity is $Y_{ch}$. In the case where the frequency hopping at four frequency domain positions is performed, the interleaving granularity is 4, and the maximum number of scheduled TBs is 2, there may not be the problem that frequency hopping is enabled and only one narrowband is occupied; however, all narrowbands may not be occupied. In the case where the frequency hopping granularity is configured to be 2 or 4, one TB cannot obtain all frequency hopping gains. In the case where the frequency hopping at 4 frequency domain positions is performed, the interleaving granularity is 4, and the maximum number of scheduled TBs is 2, the frequency hopping granularity may be 1 or more than 8 (the frequency hopping granularity may be 1). In the case where the interleaving granularity is 1, and the maximum number of scheduled TBs is two, when the frequency hopping granularity is 1, there may be the case where 4 narrowbands cannot be occupied. When the frequency hopping granularity is 2, a requirement that the frequency hopping occupies 4 narrowbands is satisfied, that is, the frequency hopping granularity is preferably greater than or equal to 2.

For the case where the frequency hopping at four frequency domain positions is performed, and the maximum number of scheduled TBs is 4, in the case where the interleaving granularity is 4, when the frequency hopping granularity is 4 or 8, all narrowbands cannot be occupied. At this time, the interleaving granularity is configured to be 1 or 2. In the case where the interleaving granularity is 1, when the frequency hopping granularity is 1, only one narrowband may be occupied, or all narrowbands cannot be occupied. When the frequency hopping granularity is 2, only two narrowbands may be occupied. That is, at this time, the frequency hopping granularity may be configured to be greater than or equal to 4.

If there is the case where all narrowband cannot be occupied, or only one narrowband is occupied, the DCI may be used for indicating another granularity or indicating that the frequency hopping is not enabled to avoid this case; or the actual frequency hopping granularity is a multiple of $Y_{ch}=4$: {1/2, 1/4, 1/N, 2, 4}, to avoid this case, where N is a positive integer; or the interleaving order is changed to avoid this case.

In an embodiment, configuring different frequency hopping granularities in different scenarios is a manner to avoid the limitation of the span gain of a narrowband. For the case of the number of narrowbands occupied by each TB, in the case where both the frequency hopping and interleaving are enabled, the design of the frequency hopping includes the manners described below.

In manner one, the frequency hopping granularity is M*U, where U denotes the granularity that the frequency hopping granularity is based on, U may be a subframe, an RU, one TB, 4 repeated TBs or an interleaving block. In this embodiment, M is configured to be at least one of {1, 2, 4, 8}.

In manner two, the number of repeated TBs is used as the frequency hopping granularity, and four implementations below are included.

In implementation one, for the case where the maximum number of scheduled TBs is 2 (that is, 2 TBs are scheduled), and the interleaving and the frequency hopping at 2 frequency domain positions are configured, in the case where the interleaving granularity is 4 repeated TBs, the frequency hopping granularity is 1 or 2 repeated TBs; and in the case where the interleaving granularity is 1 repeated TB, the frequency hopping granularity is 2 repeated TBs (For ease of design, the frequency hopping granularity may be configured to be 2 repeated TBs).

In implementation two, for the case where the maximum number of scheduled TBs is 4 (that is, 4 TBs are scheduled), and the interleaving and the frequency hopping at 2 frequency domain positions are configured, in the case where the interleaving granularity is 4 repeated TBs, the frequency hopping granularity may be configured to be 1 or 2 repeated TBs; and in the case where the interleaving granularity is 1 repeated TB, the frequency hopping granularity may be configured to be 4 repeated TBs.

In implementation three, for the case where the maximum number of scheduled TBs is 2, and the interleaving and the frequency hopping at 4 frequency domain positions are configured, in the case where the interleaving granularity is 4 repeated TBs, the frequency hopping granularity may be configured to be 1 repeated TB; and in the case where the interleaving granularity is 1 repeated TB, the frequency hopping granularity may be configured to be 2 repeated TBs.

In implementation four, for the case where the maximum number of scheduled TBs is 4, and the interleaving and the frequency hopping at 4 frequency domain positions are configured, in the case where the interleaving granularity is 4 repeated TBs, the frequency hopping granularity may be configured to be 1 or 2 repeated TBs; and in the case where the interleaving granularity is 1 repeated TB, the frequency hopping granularity may be configured to be 4 repeated TBs.

In an embodiment, the scheduling method further includes the step described below.

In the case where multiple TBs are scheduled in one PDCCH, scheduling information includes one of the following: first joint indication information, second joint indication information or third joint indication information. The first joint indication information includes a hybrid automatic repeat request (HARQ) process identifier (ID), the number of TBs and new data indication (NDI) information. The second joint indication information includes a HARQ process ID, the number of TBs, NDI information, a redundancy version (RV) and frequency hopping (FH) information. The FH information includes at least one of the frequency hopping information or the extension information of a modulation and coding scheme (MCS) used when 64 quadrature amplitude modulation (QAM) is supported. The third joint indication information includes a HARQ process ID, the number of TBs, NDI information and an RV.

In an embodiment, the scheduling information is used for scheduling multiple TBs, and each TB is scheduled by one HARQ process.

In an embodiment, in the case where a time division duplex (TDD) uplink/downlink configuration format 6 is supported, the maximum number of HARQ processes scheduled in a downlink is 8, and 13 bits are used for indicating the second joint indication information.

In an embodiment, in the case where the number of HARQ processes scheduled in the downlink is 8, the RV includes 1 bit and is indicated as a shared RV, and the FH information includes 1 bit for indicating the frequency hopping information. Alternatively, in the case where the number of HARQ processes scheduled in the downlink is 2, each TB uses the 1-bit RV or 1 bit for indicating the FH information.

In an embodiment, in the case where the TDD uplink/downlink configuration 6 is supported, the maximum number of HARQ processes scheduled in an uplink is 6, 10 bits are used for indicating the first joint indication information, and 3 bits are used for indicating the RV and the FH information. Alternatively, the maximum number of HARQ processes scheduled in the uplink is 6, and 10 bits are used for indicating the first joint indication information. Alternatively, the maximum number of HARQ processes scheduled in the uplink is 6, and 12 bits are used for indicating the third joint indication information.

In an embodiment, in the case where 10 bits are used for indicating the first joint indication information, and the number of TBs is 1, 3, 4, 5 or 6, 2 bits are used for indicating the RV, and 1 bit is used for indicating the FH information. Alternatively, in the case where the number of TBs is 2, each TB uses 1 bit for indicating the RV and uses 1 bit for indicating the FH information.

In an embodiment, in the case where 12 bits are used for indicating the third joint indication information, and the number of TBs is 1, 3, 4, 5 or 6, 2 bits are used for indicating the RV. Alternatively, in the case where the number of TBs is 2, each TB uses 1 bit for indicating the RV.

In an embodiment, in the case where the number of TBs is 3, 4, 5 or 6, 1 bit is used for indicating an RV of a TB corresponding to first [N/2] HARQ processes or [N/2] HARQ processes, and 1 bit is used for indicating an RV of a TB corresponding to a remaining HARQ process.

In an embodiment, in the case where TDD uplink/downlink configuration 4 is supported, the maximum number of HARQ processes scheduled in an uplink is 2, 3 bits are used for indicating the first joint indication information, and 1 bit is used for indicating the FH information, or each TB uses a corresponding 2-bit RV for indication. Alternatively, in the case where the TDD uplink/downlink configuration 4 is supported, the maximum number of HARQ processes scheduled in the uplink is 2, 8 bits or 6 bits are used for indicating the second joint indication information, or each TB uses the 2-bit RV for indication. Alternatively, in the case of the TDD uplink/downlink configuration, the maximum number of HARQ processes scheduled in the uplink is 2, 7 bits or 5 bits are used for indicating the second joint indication information, or each TB uses the 2-bit RV for indication.

In an embodiment, in the case of TDD uplink/downlink configuration 3, the maximum number of HARQ processes scheduled in an uplink is 3, 5 bits are used for indicating the first joint indication information. Alternatively, in the case where the TDD uplink/downlink configuration 3 is supported, the maximum number of HARQ processes scheduled in the uplink is 3, and 11 bits are used for indicating the second joint indication information. Alternatively, in the case where the TDD uplink/downlink configuration 3 is supported, the maximum number of HARQ processes scheduled in the uplink is 3, 10 bits are used for indicating the third joint indication information, or each TB uses a 2-bit RV for indication.

In an embodiment, in the case where TDD uplink/downlink configuration 1 is supported, the maximum number of HARQ processes scheduled in a downlink is 9, and 13 bits are used for indicating the second joint indication information.

In an embodiment, in the case where the TDD uplink/downlink configuration 1 is supported, the maximum number of HARQ processes scheduled in an uplink is 4, and 7 bits are used for jointly indicating the third joint indication information. Alternatively, in the case where the TDD uplink/downlink configuration 1 is supported, the maximum number of HARQ processes scheduled in the uplink is 4, and 11 bits are used for indicating the second joint indication information. Alternatively, in the case where the TDD uplink/downlink configuration 1 is supported, the maximum number of HARQ processes scheduled in the uplink is 4, and 10 bits are used for jointly indicating the third joint indication information.

In an embodiment, in the case where TDD uplink/downlink configuration 0 is supported, the maximum number of HARQ processes scheduled in a downlink is 6, and 10 bits are used for jointly indicating the first joint indication information.

In an embodiment, in the case where the TDD uplink/downlink configuration 0 is supported, the maximum number of HARQ processes scheduled in an uplink is 7, and 12 bits are used for jointly indicating the first joint indication information. Alternatively, in the case where the TDD uplink/downlink configuration 0 is supported, the maximum number of HARQ processes scheduled in the uplink is 7, and 13 bits are used for jointly indicating the second joint indication information. Alternatively, in the case where the TDD uplink/downlink configuration 0 is supported, the maximum number of HARQ processes scheduled in the uplink is 7, and 12 bits are used for jointly indicating the third joint indication information.

In an implementation, for the case where the maximum number of scheduled processes in a TDD scenario is less than or equal to 8, the scheduling of multiple HARQ processes may be indicated by using three indication manners described below.

In an indication manner, the scheduling information includes first joint indication information, and the first joint indication information includes a HARQ process ID, the number of TBs and NDI information.

In an indication manner, the scheduling information includes second joint indication information, and the second joint indication information includes a HARQ process ID, the number of TBs, NDI information, an RV and FH information. The FH information includes at least one of the frequency hopping information or the extension information of the MCS used when the 64QAM is supported.

In an indication manner, the scheduling information includes third joint indication information, and the third joint indication information includes a HARQ process ID, the number of TBs, NDI information and an RV.

In an embodiment, in the case where the TDD uplink/downlink configuration format 6 is supported, the maximum number of HARQ processes scheduled in the downlink is 8, and the 13 bits are used for indicating the second joint indication information. Table 5 is a schematic table of the indication of the scheduling of multiple HARQ processes provided by this embodiment of the present application. Table 6 is another schematic table of the indication of the scheduling of multiple HARQ processes provided by this embodiment of the present application. Table 7 is another schematic table of the indication of the scheduling of multiple HARQ processes provided by this embodiment of the present application. In Tables 5 and 6, a HARQ index denotes an index value of a HARQ process ID, that is, an ID number of a HARQ process. N1, N2, . . . N8 denote the NDI information. An RV denotes the RV. RV2-1 denotes the RV of the first process of two scheduled HARQ processes. FH2-2 denotes the FH information of the second process of the two scheduled HARQ processes. FH1 denotes the FH information when one HARQ process is scheduled.

In preceding Tables 5 to 7, in the case where the number of HARQ processes scheduled in the downlink is 8, the RV includes 1 bit and is indicated as the shared RV, and the FH information includes 1 bit for indicating the frequency hopping information.

In the case where the number of HARQ processes scheduled in the downlink is 2, each TB uses a 1-bit RV for indication, and 1 bit is used for indicating the FH information.

In an embodiment, in the case where the TDD uplink/downlink configuration 6 is supported, the maximum number of HARQ processes scheduled in the uplink is 6, 10 bits are used for indicating the HARQ process ID, the number of TBs and the NDI information, and 3 bits are used for indicating the RV and the FH information. Table 8 is a schematic table of the indication of the scheduling of multiple HARQ processes provided by this embodiment of the present application.

TABLE 5

Schematic table of the indication of the scheduling of multiple HARQ processes

| The Number | Bit | | | | | | | | | | | | |
|---|---|---|---|---|---|---|---|---|---|---|---|---|---|
| of TBs | 1 | 2 | 3 | 4 | 5 | 6 | 7 | 8 | 9 | 10 | 11 | 12 | 13 |
| 1 | 0 | 0 | 0 | 0 | 0 | 0 | HARQ ID index | | | N1 | | RV | FH1 |
| 2 | 0 | 0 | 0 | | | | HARQ2 index + 8 | | | N1 | N2 | RV2-1 | RV/FH2-2 |
| 3 | 0 | 0 | 0 | | | | HARQ3 index + 56 | | | | N1 | N2 | N3 |
| 4 | 0 | | | | HARQ4 index + 64 (10000101) | | | | | N1 | N2 | N3 | N4 |
| 5 | 0 | | | HARQ5 index + 67 (1111010) | | | | | N1 | N2 | N3 | N4 | N5 |
| 6 | | | HARQ6 index + 62 (1011001) | | | | | N1 | N2 | N3 | N4 | N5 | N6 |
| 7 | HARQ7 index + 45 (110100) | | | | | | N1 | N2 | N3 | N4 | N5 | N6 | N7 |
| 8 | 1 | 1 | 1 | 0 | N1 | N2 | N3 | N4 | N5 | N6 | N7 | N8 | RV/FH8 |

TABLE 6

Schematic table of the indication of the scheduling of multiple HARQ processes

| The Number | Bit | | | | | | | | | | | | |
|---|---|---|---|---|---|---|---|---|---|---|---|---|---|
| of TBs | 1 | 2 | 3 | 4 | 5 | 6 | 7 | 8 | 9 | 10 | 11 | 12 | 13 |
| 1 | 0 | 0 | 0 | 0 | 0 | 0 | HARQ ID index | | | N1 | | RV | FH1 |
| 2 | 0 | 0 | 0 | | | | HARQ2 index + 8 | | | N1 | N2 | RV2-1 | RV/FH2-2 |
| 3 | 0 | 0 | 0 | | | | HARQ3 index + 56 | | | | N1 | N2 | N3 |
| 4 | 0 | | | | HARQ4 index + 64 (10000101) | | | | | N1 | N2 | N3 | N4 |
| 5 | 0 | | | HARQ5 index + 67 (1111010) | | | | | N1 | N2 | N3 | N4 | N5 |
| 6 | | | HARQ6 index + 62 (1011001) | | | | | N1 | N2 | N3 | N4 | N5 | N6 |
| 7 | HARQ7 index + 45 (110100) | | | | | | N1 | N2 | N3 | N4 | N5 | N6 | N7 |
| 8 | 1 | 1 | 1 | N1 | N2 | N3 | N4 | N5 | N6 | N7 | N8 | RV | FH8 |

TABLE 7

Schematic table of the indication of the scheduling of multiple HARQ processes

| The Number | Bit | | | | | | | | | | | | |
|---|---|---|---|---|---|---|---|---|---|---|---|---|---|
| of TBs | 1 | 2 | 3 | 4 | 5 | 6 | 7 | 8 | 9 | 10 | 11 | 12 | 13 |
| 1 | 0 | 0 | 0 | 0 | 0 | 0 | HARQ ID index | | | N1 | | RV | FH1 |
| 2 | 0 | 0 | 0 | | | | HARQ2 index + 4 | | | N2 | N1 | RV2-1 | RV2-2 | FH2 |
| 3 | 0 | 0 | | HARQ3 index + 128 (10000000 to 10110111) | | | | | | | N1 | N2 | N3 |
| 4 | 0 | | HARQ4 index + 92 (01011100 to 10100001) | | | | | | | N1 | N2 | N3 | N4 |
| 5 | | HARQ5 index + 81 (01010001 to 10001000) | | | | | | | N1 | N2 | N3 | N4 | N5 |
| 6 | | HARQ6 index + 69 (1000101 to 1100000) | | | | | | N1 | N2 | N3 | N4 | N5 | N6 |
| 7 | HARQ7 index + 49 (110001 to 111000) | | | | | | N1 | N2 | N3 | N4 | N5 | N6 | N7 |
| 8 | 1 | 1 | 1 | 1 | N1 | N2 | N3 | N4 | N5 | N6 | N7 | N8 | RV/FH8 |

TABLE 8

Schematic table of the indication of the scheduling of multiple HARQ processes

| The Numbers of TBs | Bit | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 1 | 0 | 0 | 0 | 0 | 0 | 0 | HARQ1 index (101) | | N1 | RV | | FH1 |
| 2 | 0 | 0 | 0 | 0 | HARQ2 index + 3 (10001) | | | | N2 | N1 | RV2-1 | RV2-2 | FH2 |
| 3 | 0 | 0 | HARQ3 index + 5 (00101 to 11000) | | | | | N3 | N2 | N1 | RV | | FH3 |
| 4 | 0 | HARQ4 index + 13 (01101 to 11011) | | | | | N4 | N3 | N2 | N1 | RV | | FH4 |
| 5 | HARQ4 index + 14 (01110 to 10011) | | | | | N5 | N4 | N3 | N2 | N1 | RV | | FH5 |
| 6 | 1 | 0 | 1 | 0 | N6 | N5 | N4 | N3 | N2 | N1 | RV | | FH6 |

In an embodiment, in the case where the TDD uplink/downlink configuration 6 is supported, the maximum number of HARQ processes scheduled in the uplink is 6, 10 bits are used for indicating the HARQ process ID, the number of TBs and the NDI information. An expression is made by using the following formula:

$$M = \sum_{j=1}^{m-1} 2^j C_H^j + 2^m \sum_{i=0}^{m-1} C_{H-1-i}^{m-i} + x_m 2^{m-1} + x_2 2^{m-2} + \ldots + x_1 2^0$$

M denotes a scheduling state index, j denotes the number of currently scheduled processes, m denotes the process number of the initial position of a process, the NDI information corresponding to j currently scheduled processes is: $x_m, \ldots, x_2, x_1$, that is, the NDI value corresponding to m scheduled HARQ processes.

Alternatively, Table 9 is used for expression. Table 9 is a schematic table of the indication of the scheduling of multiple HARQ processes provided by this embodiment of the present application.

TABLE 9

Schematic table of the indication of the scheduling of multiple HARQ processes

| The Numbers of TBs | Bit | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 0 | 0 | 0 | 0 | HARQ1 index (101) | | N1 | |
| 2 | 0 | 0 | 0 | 0 | HARQ2 index + 3 (10001) | | | | N2 | N1 |
| 3 | 0 | 0 | HARQ3 index + 5 (00101 to 11000) | | | | | N3 | N2 | N1 |
| 4 | 0 | HARQ4 index + 13 (01101 to 11011) | | | | | N4 | N3 | N2 | N1 |
| 5 | HARQ4 index + 14 (01110 to 10011) | | | | | N5 | N4 | N3 | N2 | N1 |
| 6 | 1 | 0 | 1 | 0 | N6 | N5 | N4 | N3 | N2 | N1 |

As shown in Table 9, in the case where the number of scheduled TBs is 1, 3, 4, 5 or 6, 2 bits are used for indicating the RV, and 1 bit is used for indicating the FH information.

In the case where the number of scheduled TBs is 2, each TB uses 1 bit for indicating the RV and 1 bit for indicating the FH information.

For the case where the number of scheduled TBs is 3, 4, 5 and 6, 2 bits used for indicating the RV may also be divided into 1 bit used for indicating the RV of a TB corresponding to first [N/2] HARQ processes or [N/2] HARQ processes and another 1 bit used for indicating the RV of a remaining TB.

In an embodiment, in the case where the TDD uplink/downlink configuration 6 is supported, the maximum number of HARQ processes scheduled in the uplink is 6, 12 bits are used for indicating the HARQ process ID, the number of TBs, the NDI information and the RV. Table 10 is a schematic table of the indication of the scheduling of multiple HARQ processes provided by this embodiment of the present application.

TABLE 10

Schematic table of the indication of the scheduling of multiple HARQ processes

| The Number of TBs | Bit | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 0 | 0 | 0 | 0 | 0 | 0 | HARQ1 index (101) | | N1 | RV | |
| 2 | 0 | 0 | 0 | 0 | HARQ2 index + 3 (10001) | | | | N2 | N1 | RV2-1 | RV2-2 |
| 3 | 0 | 0 | HARQ3 index + 5 (00101 to 11000) | | | | | N3 | N2 | N1 | RV | |
| 4 | 0 | HARQ4 index + 13 (01101 to 11011) | | | | | N4 | N3 | N2 | N1 | RV | |
| 5 | HARQ4 index + 14 (01110 to 10011) | | | | | N5 | N4 | N3 | N2 | N1 | RV | |
| 6 | 1 | 0 | 1 | 0 | N6 | N5 | N4 | N3 | N2 | N1 | RV | |

As shown in Table 10, in the case where 12 bits are used for indicating the HARQ process ID, the number of TBs, the NDI information and the RV, and the number of currently scheduled TB s is 1, 3, 4, 5 and 6, 2 bits are used for indicating the RV. Alternatively, in the case where the number of currently scheduled TBs is 2, each TB uses 1 bit for indicating the RV.

In the case where the number of TBs is 3, 4, 5 and 6, 1 bit is used for indicating the RV of a TB corresponding to first [N/2] HARQ processes or [N/2] HARQ processes, and 1 bit is used for indicating the RV of a TB corresponding to a remaining HARQ process.

In an embodiment, in the case where TDD uplink/downlink configuration 5 is supported, the maximum number of HARQ processes scheduled in a downlink is 16, and the details of the indication scheme of multiple HARQ processes are not repeated here. Uplink scheduling only supports one HARQ process, that is, the multi-TB scheduling cannot be supported.

In an embodiment, in the case where the TDD uplink/downlink configuration 4 is supported, the maximum number of HARQ processes scheduled in a downlink is 14, 13 bits are used for indicating the HARQ process ID, the number of TBs, the NDI information, the RV and the FH information, and 1 bit is used for grouping multiple HARQ processes. The details of the indication scheme of multiple HARQ processes are not repeated here.

In an embodiment, in the case where the TDD uplink/downlink configuration 4 is supported, the maximum number of HARQ processes scheduled in the uplink is 2, 3 bits are used for indicating the HARQ process ID, the number of TBs and the NDI information, and 1 bit is used for indicating the FH information, or each TB uses a corresponding 2-bit RV for indication.

In an embodiment, in the case where the TDD uplink/downlink configuration 4 is supported, the maximum number of HARQ processes scheduled in the uplink is 2, 8 bits are used for indicating the second joint indication information, or each TB uses the 2-bit RV for indication. Table 11 is a schematic table of the indication of the scheduling of multiple HARQ processes provided by this embodiment of the present application.

TABLE 11

Schematic table of the indication of the scheduling of multiple HARQ processes

| The Number of TBs | Bit | | | | | | | |
|---|---|---|---|---|---|---|---|---|
| | 1 | 2 | 3 | 4 | 5 | 6 | 7 | 8 |
| 1 | 0 | HARQ index | N1 | | | RV | | FH1 |
| 2 | 1 | N2 | N1 | RV2-1 | | RV2-2 | | FH2 |

As shown in Table 11, there are multiple idle bits. Thus, each TB may use 2 bits for indicating the RV, and other bits may be filled or all set to 0 or 1.

In an embodiment, 110111 is used for triggering an early termination.

In an embodiment, in the case where the TDD uplink/downlink configuration 4 is supported, the maximum number of HARQ processes scheduled in the uplink is 2, 6 bits are used for indicating the second joint indication information, or each TB uses the 2-bit RV for indication. Table 12 is a schematic table of the indication of the scheduling of multiple HARQ processes provided by this embodiment of the present application.

TABLE 12

Schematic table of the indication of the scheduling of multiple HARQ processes

| The Number of TBs | Bit | | | | | |
|---|---|---|---|---|---|---|
| | 1 | 2 | 3 | 4 | 5 | 6 |
| 1 | 0 | HARQ index | N1 | RV | | FH1 |
| 2 | 1 | N2 | N1 | RV2-1 | RV2-2 | FH2 |

In an embodiment, in the case where the TDD uplink/downlink configuration 4 is supported, the maximum number of HARQ processes scheduled in the uplink is 2, 7 bits are used for indicating the second joint indication information, or each TB uses the 2-bit RV for indication. Table 13 is a schematic table of the indication of the scheduling of multiple HARQ processes provided by this embodiment of the present application.

TABLE 13

Schematic table of the indication of the scheduling of multiple HARQ processes

| The Number of TBs | Bit | | | | | | |
|---|---|---|---|---|---|---|---|
| | 1 | 2 | 3 | 4 | 5 | 6 | 7 |
| 1 | 0 | HARQ index | N1 | | | | RV |
| 2 | 1 | N2 | N1 | RV2-1 | | RV2-2 | |

As shown in Table 13, each TB may use 2 bits for indicating the RV, and other bits may be filled or all set to 0 or 1.

In an embodiment, in the case where the TDD uplink/downlink configuration 4 is supported, the maximum number of HARQ processes scheduled in the uplink is 2, 5 bits are used for indicating the second joint indication information, or each TB uses the 2-bit RV for indication. Table 14 is a schematic table of the indication of the scheduling of multiple HARQ processes provided by this embodiment of the present application.

TABLE 14

Schematic table of the indication of the scheduling of multiple HARQ processes

| The Number of TBs | Bit | | | | |
|---|---|---|---|---|---|
| | 1 | 2 | 3 | 4 | 5 |
| 1 | 0 | HARQ index | N1 | RV | |
| 2 | 1 | N2 | N1 | RV2-1 | RV2-2 |

As shown in Table 14, each TB may use 2 bits for indicating the RV.

In an embodiment, in the case of the TDD uplink/downlink configuration 3, the maximum number of HARQ processes scheduled in a downlink is 11, 13 bits are used for indicating the HARQ process ID, the number of TBs, the NDI information, the RV and the FH information, and 1 bit is used for grouping HARQ processes. The details of the description of the indication of multiple HARQ processes are not repeated here.

In an embodiment, in the case of the TDD uplink/downlink configuration 3, the maximum number of HARQ processes scheduled in the uplink is 3, 5 bits are used for indicating the HARQ process ID, the number of TBs and the NDI information.

In an embodiment, in the case where the TDD uplink/downlink configuration 3 is supported, the maximum number of HARQ processes scheduled in the uplink is 3, and 11 bits are used for indicating the second joint indication information. Table 15 is a schematic table of the indication of the scheduling of multiple HARQ processes provided by this embodiment of the present application.

TABLE 15

Schematic table of the indication of the scheduling of multiple HARQ processes

| The Number of TBs | Bit | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | 0 | 0 | 0 | 0 | 0 | HARQ index | | N1 | RV | | FH1 |
| 2 | 0 | 0 | 0 | HARQ2 index + 2 | | | | RV2-1 | RV2-2 | | FH2 |
| 3 | 0 | N1 | N2 | N3 | RV3-1 | | | RV3-2 | RV3-3 | | FH3 |

In an embodiment, in the case where the TDD uplink/downlink configuration 3 is supported, the maximum number of HARQ processes scheduled in the uplink is 3, 10 bits are used for indicating the third joint indication information, or each TB uses the 2-bit RV for indication. Table 16 is a schematic table of the indication of the scheduling of multiple HARQ processes provided by this embodiment of the present application.

TABLE 16

Schematic table of the indication of the scheduling of multiple HARQ processes

| The Number of TBs | Bit | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 0 | 0 | 0 | HARQ index | | N1 | RV | |
| 2 | 0 | 0 | 0 | HARQ2 index + 2 | | | | RV2-1 | RV2-2 | |
| 3 | 0 | N1 | N2 | N3 | RV3-1 | | | RV3-2 | RV3-3 | |

In an embodiment, in the case where TDD uplink/downlink configuration 2 is supported, the maximum number of HARQ processes scheduled in a downlink is 12, 13 bits are used for indicating the HARQ process ID, the number of TBs, the NDI information, the RV and the FH information, and 1 bit is used for grouping multiple HARQ processes. The details of the description of the indication of multiple HARQ processes are not repeated here.

In an embodiment, in the case where the TDD uplink/downlink configuration 1 is supported, the maximum number of HARQ processes scheduled in the downlink is 9, and 13 bits are used for indicating the second joint indication information.

In an embodiment, in the case where the TDD uplink/downlink configuration 1 is supported, the maximum number of HARQ processes scheduled in the uplink is 4, 7 bits are used for jointly indicating the HARQ process ID, the number of TBs, the NDI information and the RV.

In an embodiment, in the case where the TDD uplink/downlink configuration 1 is supported, the maximum number of HARQ processes scheduled in the uplink is 4, and 11 bits are used for indicating the second joint indication information. Table 17 is a schematic table of the indication of the scheduling of multiple HARQ processes provided by this embodiment of the present application.

TABLE 17

Schematic table of the indication of the scheduling of multiple HARQ processes

| The Numbers of TBs | Bit | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | 0 | 0 | 0 | 0 | 0 | HARQ index | | N1 | RV | | FH1 |
| 2 | 0 | 0 | 0 | HARQ2 index + 2 | | | N1 | N2 | RV2-1 | RV2-2 | FH2 |
| 3 | 0 | HARQ3 index + 2 (101) | | N3 | N2 | N1 | RV3-1 | RV3-2 | RV3-3 | | FH3 |
| 4 | 1 | 0 | N4 | N3 | N2 | N1 | RV4-1 | RV4-2 | RV4-3 | RV4-4 | FH4 |

In this embodiment, 110111 is used for triggering the early termination.

In an embodiment, in the case where the TDD uplink/downlink configuration 1 is supported, the maximum number of HARQ processes scheduled in the uplink is 4, 10 bits are used for jointly indicating the HARQ process ID, the number of TBs, the NDI information and the RV. Table 18 is a schematic table of the indication of the scheduling of multiple HARQ processes provided by this embodiment of the present application.

TABLE 18

Schematic table of the indication of the scheduling of multiple HARQ processes

| The Numbers of TBs | Bit | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 0 | 0 | 0 | HARQ index | | N1 | RV | |
| 2 | 0 | 0 | 0 | HARQ2 index + 2 | | | N1 | N2 | RV2-1 | RV2-2 |
| 3 | 0 | HARQ3 index + 2 (101) | | | N3 | N2 | N1 | RV3-1 | RV3-2 | RV3-3 |
| 4 | 1 | 0 | N4 | N3 | N2 | N1 | RV4-1 | RV4-2 | RV4-3 | RV4-4 |

In an embodiment, in the case where the TDD uplink/downlink configuration 0 is supported, the maximum number of HARQ processes scheduled in the downlink is 6, 10 bits are used for jointly indicating the HARQ process ID, the number of TBs and the NDI information.

In an embodiment, in the case where the TDD uplink/downlink configuration 0 is supported, the maximum number of HARQ processes scheduled in the uplink is 7, 12 bits are used for jointly indicating the HARQ process ID, the number of TBs and the NDI information.

In an embodiment, in the case where the TDD uplink/downlink configuration 0 is supported, the maximum number of HARQ processes scheduled in the uplink is 7, and 13 bits are used for jointly indicating the second joint indication information. Table 19 is a schematic table of the indication of the scheduling of multiple HARQ processes provided by this embodiment of the present application.

In Tables 8 to 20, for the explanation about HARQ index, N1, N2, . . . , N8, RV2-1, RV2-2 and FH1, . . . , and FH7, reference is made to the description of the preceding embodiments, and the details are not repeated here.

In an embodiment, in the case where multiple TBs are scheduled in one PDCCH, the scheduling method further includes that a first preset bit value is indicated through DCI, where the first preset bit value is used for indicating the bundling size for TBs; or a second preset bit value is indicated through the DCI, where the second preset bit value is used for indicating the bundling size for TBs or indicating not enabling; or a third preset bit value is indicated through the DCI, where the third preset bit value is used for indicating the manner of TBs bundling.

TABLE 19

Schematic table of the indication of the scheduling of multiple HARQ processes

| The Numbers of TBs | Bit | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 1 | 0 | 0 | 0 | 0 | 0 | 0 | HARQ index | | N1 | RV | | | FH1 |
| 2 | 0 | 0 | 0 | HARQ2 index + 4 (00100 to 11000) | | | | N2 | N1 | RV2-1 | RV2-2 | | FH2 |
| 3 | 0 | 0 | HARQ3 index + 50 (0110010 to 1010100) | | | | | | N3 | N2 | | N1 | FH3 |
| 4 | 0 | HARQ4 index + 43 (0101011 to 1001101) | | | | | | N4 | N3 | N2 | | N1 | FH4 |
| 5 | 0 | HARQ5 index + 39 (100111 to 111011) | | | | | N5 | N4 | N3 | N2 | | N1 | FH5 |
| 6 | HARQ6 index + 30 (011110 to 100100) | | | | | N6 | N5 | N4 | N3 | N2 | | N1 | FH6 |
| 7 | 1 | 0 | 1 | N7 | N6 | N5 | N4 | N3 | N2 | N1 | RV | | FH7 |

In an embodiment, in the case where the TDD uplink/downlink configuration 0 is supported, the maximum number of HARQ processes scheduled in the uplink is 7, 12 bits are used for jointly indicating the HARQ process ID, the number of TBs, the NDI information and the RV. Table 20 is a schematic table of the indication of the scheduling of multiple HARQ processes provided by this embodiment of the present application.

In an embodiment, the third preset bit value is used for indicating the manner of TBs bundling. The manner of TBs bundling includes one of the following: consecutive TB bundling or discrete TB bundling.

The consecutive TB bundling refers to that N bundled TBs are consecutive in a time domain. The discrete TB bundling refers to that the N bundled TBs are inconsecutive in the time domain

TABLE 20

Schematic table of the indication of the scheduling of multiple HARQ processes

| The Numbers of TBs | Bit | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 0 | 0 | 0 | 0 | 0 | 0 | HARQ index | | N1 | RV | | |
| 2 | 0 | 0 | 0 | HARQ2 index + 4 (00100 to 11000) | | | | N2 | N1 | RV2-1 | | RV2-2 |
| 3 | 0 | 0 | HARQ3 index + 50 (0110010 to 1010100) | | | | | | N3 | N2 | | N1 |
| 4 | 0 | HARQ4 index + 43 (0101011 to 1001101) | | | | | | N4 | N3 | N2 | | N1 |
| 5 | 0 | HARQ5 index + 39 (100111 to 111011) | | | | | N5 | N4 | N3 | N2 | | N1 |
| 6 | HARQ6 index + 30 (011110 to 100100) | | | | | N6 | N5 | N4 | N3 | N2 | | N1 |
| 7 | 1 | 0 | 1 | N7 | N6 | N5 | N4 | N3 | N2 | N1 | RV | |

In an implementation, the second preset bit value is used for indicating the bundling size for TBs or indicating the enabling state of bundled TB s.

In an embodiment, the first preset bit value is used for indicating the bundling size for TBs. In an embodiment, in the case where the first preset bit value occupies 2 bits, and 2 bits are used for indicating the bundling size for TBs, 4 states indicate that the bundling size for TBs is 1, 2, 3, 4 respectively.

In an embodiment, the first preset bit value is used for indicating the bundling size for TBs. In an embodiment, in the case where the first preset bit value occupies 2 bits, and 2 bits are used for indicating the bundling size for TBs, 4 states indicate that the bundling size for TBs includes at least 1, 2 and 4.

In an implementation, the third bit value is used for indicating the manner of TBs bundling. In an embodiment, the manner of TBs bundling includes one of the following: consecutive TB bundling or discrete TB bundling. The consecutive TB bundling refers to that the N bundled TBs are consecutive in the time domain The discrete TB bundling refers to that the N bundled TBs are inconsecutive in the time domain.

In an embodiment, the first preset bit value occupies 1 bit, and the 1 bit is used for indicating the bundling size for TBs and indicating that the bundling size for TBs is 2 or 4.

In an embodiment, the first preset bit value occupies 1 bit, and the 1 bit is used for indicating the bundling size for TBs and indicating that the bundling size for TBs is 1 or 4.

Figure 3:
FIG. 3 is a diagram indicating the bundling size for TBs according to an embodiment of the present application.
Figure 3:
Figure 3:
Figure 3:

FIG. 3 is a diagram indicating the bundling size for TBs according to an embodiment of the present application. As shown in FIG. 3, TBs bundled in the first row are spaced at intervals of 0 TB, and the bundling size for TBs is 2. TBs bundled in the second row are spaced at intervals of 1 TB, and the bundling size for TBs is 2. TBs bundled in the third row are spaced at intervals of 0 TB, and the bundling size for TB s is 4. TB s bundled in the fourth row are spaced at intervals of 1 TB, and the bundling size for TBs is 4. In this embodiment, the manner of TBs bundling corresponding to the first row and the third row is the consecutive TB bundling, and the manner of TBs bundling corresponding to the second row and the fourth row is the discrete TB bundling.

In an embodiment, in the case where multiple TBs are scheduled in one PDCCH, the scheduling method further includes that, before each TB or between every two TBs, the length of a gap is extended. The length of the gap includes at least one of the following: 0, 16, 32, 64, 128, 512, 1024 or 2048.

In an embodiment, if the resource length of acknowledge (ACK)/negative acknowledge (NACK) is less than or equal to the resource length of one TB, the timing relationship of the ACK/NACK corresponding to each TB is n+k, and the value of k may include 4. If the resource length of the ACK/NACK is greater than or equal to the length of one TB, the timing relationship of the ACK/NACK corresponding to the first TB is n+k, and another ACK/NACK is sent consecutively, where n denotes the end subframe of a physical downlink shared channel (PDSCH), and the resource length denotes the length of an occupied time domain resource.

Figure 4:
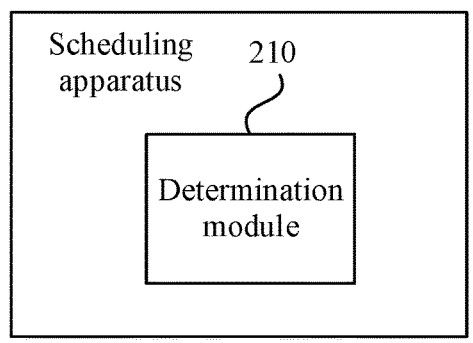
FIG. 4 is a block diagram of a scheduling apparatus according to an embodiment of the present application.

FIG. 4 is a block diagram of a scheduling apparatus according to an embodiment of the present application. As shown in FIG. 4, the scheduling apparatus in this embodiment includes a determination module 210. The determination module 210 is configured to, in the case where multiple TBs are scheduled in one PDCCH, determine the order of the TBs and the narrowband position of a TB according to the predefined rule. The predefined rule includes at least one of a predefined frequency hopping rule or a predefined interleaving rule.

The scheduling apparatus provided in this embodiment is configured to perform the scheduling method of the embodiment shown in FIG. 1. The implementation principle and the technical effect of the scheduling apparatus provided in this embodiment are similar, and the details are not repeated here.

In an embodiment, in the case where the predefined rule is the predefined interleaving rule, the order of the TBs is determined according to the interleaving block index.

In an embodiment, the operation in which the order of the TBs is determined according to the interleaving block index includes one of the following operations: the relative positions of all TBs in the interleaving block with an index number c are obtained by shifting the relative positions of all TBs in the interleaving block with an index number c−1; or The relative positions of all TBs in the interleaving block with an index number c are obtained by shifting the relative positions of all TBs in the interleaving block with an index number 0. The shifting refers to the left shift or the right shift of the relative position of each TB in an interleaving block. The unit refers to the position unit of the shifting.

In an embodiment, the unit of the shifting includes one of the following: one TB, two TB s or the number of TBs occupied in one narrowband.

In an embodiment, in the case where the predefined rule is the predefined interleaving rule, that the order of the TB s is determined according to the predefined rule satisfies at least one of the following conditions: in the case where each TB is spanned in only a unique narrowband, the relative positions of all TBs in the interleaving block are shifted according to the predefined rule; in the case where the total number of narrowbands is 4, and the number of narrowbands in which each TB is spanned is 2, the relative positions of all TBs in the interleaving block are shifted according to the predefined rule; in the case where each TB cannot be spanned in all configured narrowbands, the relative positions of all TBs in the interleaving block are shifted according to the predefined rule; in the case where the interleaving granularity, the frequency hopping granularity, the number of scheduled TBs and the number of frequency hopping narrowbands satisfy the following relationship: $G \leq Y_{ch}$, $N_{TB}*G/(N_{band}*Y_{ch})=n$, $n=1,2,3,4$, the relative positions of all TBs in the interleaving block are shifted according to the predefined rule, where G denotes the interleaving granularity, $Y_{ch}$ denotes the frequency hopping granularity, $N_{TB}$ denotes the number of scheduled TBs, and $N_{band}$ denotes the number of frequency hopping narrowbands; or in the case where the interleaving granularity, the frequency hopping granularity, the number of scheduled TBs and the number of frequency hopping narrowbands satisfy the following relationship: $N_{TB}*G/(N_{band}*Y_{ch})=n$, $n=1/2,1,2,3,4$, the relative positions of all TBs in the interleaving block are shifted according to the predefined rule, where G denotes the interleaving granularity, $Y_{ch}$ denotes the frequency hopping granularity, $N_{TB}$ denotes the number of scheduled TBs, and $N_{band}$ denotes the number of frequency hopping narrowbands.

In an embodiment, that the relative positions of all TBs in the interleaving block with the index number c is obtained by shifting the relative positions of all TBs in the interleaving block indexed c−1 includes:

$$X_{c,r} = \mod(X_{c-1,r} \pm c*\text{shift}, N_{TB})$$

$X_{c-1, r}$ denotes the position number of the TB with a number r in the interleaving block with the index number c−1, $X_{c, r}$ denotes the position of the TB with the number r in the interleaving block indexed c, and shift denotes the offset value of the shifting.

In an embodiment, that the relative positions of all TBs in the interleaving block with the index number c is obtained by shifting the relative positions of all TBs in the interleaving block with the index number 0 includes:

$$r'_c = \mod(r \pm c^* \text{ shift}, N_{TB})$$

c denotes the interleaving block number, r denotes the TB number in the first interleaving block, r also denotes the position number, $N_{TB}$ denotes the number of scheduled TBs, $r_c'$ denotes the position of the TB with an initial number r in the interleaving block c, and shift denotes the offset value of the shifting.

In an embodiment, in the case where the predefined rule is the predefined frequency hopping rule, the configuration manner of the frequency hopping granularity includes one of the following: a predefined value or a DCI indication value.

In an embodiment, in the case where the configuration manner of the frequency hopping granularity is the DCI indication value, 2 bits are used for indication. The 2 bits are used for indicating that the frequency hopping is not enabled or indicating 3 values of the frequency hopping granularity. Alternatively, 1 bit is used for indicating 2 values of the frequency hopping granularity.

In an embodiment, in the case where the configuration manner of the frequency hopping granularity is the predefined value, the value of the predefined value includes at least one of {1, 2, 4, 8}. The unit of the frequency hopping granularity includes one of the following: one interleaving block; the product of the interleaving granularity and the number of slots or subframes occupied by each RU, the product of the number of RUs and the number of slots or subframes occupied by each RU or the product of the number of subframes and the number of slots or subframes occupied by each RU respectively; the product of the number of RUs allocated to the transmission block and the number of slots or subframes occupied by each of the RUs or the product of subframes allocated to the transmission block and the number of slots or subframes occupied by each RU respectively; one RU; or one subframe.

In an embodiment, the scheduling apparatus further performs the following operations.

In the case where multiple TBs are scheduled in one PDCCH, the scheduling information includes one of the following: first joint indication information, second joint indication information or third joint indication information. The first joint indication information includes a HARQ process ID, the number of TBs and NDI information. The second joint indication information includes a HARQ process ID, the number of TBs, NDI information, an RV and FH information. The FH information includes at least one of the FH information or the extension information of the MCS used when the 64 QAM is supported. The third joint indication information includes a HARQ process ID, the number of TBs, NDI information and an RV.

In an embodiment, in the case where a time division dual (TDD) uplink/downlink configuration format 6 is supported, the maximum number of HARQ processes scheduled in the downlink is 8, and the 13 bits are used for indicating the second joint indication information.

In an embodiment, in the case where the number of HARQ processes scheduled in the downlink is 8, the RV includes 1 bit and is indicated as the shared RV, and the FH information includes 1 bit for indicating the frequency hopping information. Alternatively, in the case where the number of HARQ processes scheduled in the downlink is 2, each TB uses the 1-bit RV or 1 bit for indicating the FH information.

In an embodiment, in the case where the TDD uplink/downlink configuration 6 is supported, the maximum number of HARQ processes scheduled in the uplink is 6, 10 bits are used for indicating the first joint indication information, and 3 bits are used for indicating the RV and the FH information. Alternatively, the maximum number of HARQ processes scheduled in the uplink is 6, and 10 bits are used for indicating the first joint indication information. Alternatively, the maximum number of HARQ processes scheduled in the uplink is 6, and 12 bits are used for indicating the third joint indication information.

In an embodiment, in the case where 10 bits are used for indicating the first joint indication information, and the number of TBs is 1, 3, 4, 5 or 6, 2 bits are used for indicating the RV, and 1 bit is used for indicating the FH information. Alternatively, in the case where the number of TBs is 2, each TB uses 1 bit for indicating the RV, and 1 bit is used for indicating the FH information.

In an embodiment, in the case where the 12 bits are used for indicating the third joint indication information, and the number of TBs is 1, 3, 4, 5 or 6, 2 bits are used for indicating the RV. Alternatively, in the case where the number of TBs is 2, each TB uses 1 bit for indicating the RV.

In an embodiment, in the case where the number of TBs is 3, 4, 5 or 6, 1 bit is used for indicating the RV of the TB corresponding to first [N/2] HARQ processes or [N/2] HARQ processes, and 1 bit is used for indicating the RV of the TB corresponding to the remaining HARQ process.

In an embodiment, in the case where the TDD uplink/downlink configuration 4 is supported, the maximum number of HARQ processes scheduled in the uplink is 2, 3 bits are used for indicating the first joint indication information, and 1 bit is used for indicating the FH information, or each TB uses the corresponding 2-bit RV for indication. Alternatively, in the case where the TDD uplink/downlink configuration 4 is supported, the maximum number of HARQ processes scheduled in the uplink is 2, 8 bits or 6 bits are used for indicating the second joint indication information, or each TB uses the 2-bit RV for indication. Alternatively, in the case where the TDD uplink/downlink configuration 4 is supported, the maximum number of HARQ processes scheduled in the uplink is 2, 7 bits or 5 bits are used for indicating the second joint indication information, or each TB uses the 2-bit RV for indication.

In an embodiment, in the case of the TDD uplink/downlink configuration 3, the maximum number of HARQ processes scheduled in the uplink is 3, 5 bits are used for indicating the first joint indication information. Alternatively, in the case where the TDD uplink/downlink configuration 3 is supported, the maximum number of HARQ processes scheduled in the uplink is 3, and 11 bits are used for indicating the second joint indication information. Alternatively, in the case where the TDD uplink/downlink configuration 3 is supported, the maximum number of HARQ processes scheduled in the uplink is 3, 10 bits are used for indicating the third joint indication information, or each TB uses the 2-bit RV for indication.

In an embodiment, in the case where the TDD uplink/downlink configuration 1 is supported, the maximum number of HARQ processes scheduled in the downlink is 9, and 13 bits are used for indicating the second joint indication information.

In an embodiment, in the case where the TDD uplink/downlink configuration 1 is supported, the maximum number of HARQ processes scheduled in the uplink is 4, and 7 bits are used for jointly indicating the third joint indication information. Alternatively, in the case where the TDD uplink/downlink configuration 1 is supported, the maximum number of HARQ processes scheduled in the uplink is 4, and 11 bits are used for indicating the second joint indication information. Alternatively, in the case where the TDD uplink/downlink configuration 1 is supported, the maximum number of HARQ processes scheduled in the uplink is 4, and 10 bits are used for jointly indicating the third joint indication information.

In an embodiment, in the case where the TDD uplink/downlink configuration 0 is supported, the maximum number of HARQ processes scheduled in the downlink is 6, and 10 bits are used for jointly indicating the first joint indication information.

In an embodiment, in the case where the TDD uplink/downlink configuration 0 is supported, the maximum number of HARQ processes scheduled in the uplink is 7, and 12 bits are used for jointly indicating the first joint indication information. Alternatively, in the case where the TDD uplink/downlink configuration 0 is supported, the maximum number of HARQ processes scheduled in the uplink is 7, and 13 bits are used for jointly indicating the second joint indication information. Alternatively, in the case where the TDD uplink/downlink configuration 0 is supported, the maximum number of HARQ processes scheduled in the uplink is 7, and 12 bits are used for jointly indicating the third joint indication information.

In an embodiment, in the case where multiple TBs are scheduled in one PDCCH, the scheduling apparatus further includes an indication module.

The indication module is configured to indicate the first preset bit value through the DCI. The first preset bit value is used for indicating the bundling size for TBs. Alternatively, the indication module is configured to indicate the second preset bit value through the DCI. The second preset bit value is used for indicating the bundling size for TBs or indicate not enabling. Alternatively, the indication module is configured to indicate the third preset bit value through the DCI. The third preset bit value is used for indicating the manner of TBs bundling.

In an embodiment, the third preset bit value is used for indicating the manner of TBs bundling. The manner of TBs bundling includes one of the following: consecutive TB bundling or discrete TB bundling.

The consecutive TB bundling refers to that the N bundled TBs are consecutive in the time domain. The discrete TB bundling refers to that the N bundled TB s are inconsecutive in the time domain In an embodiment, in the case where multiple TBs are scheduled in one PDCCH, the scheduling apparatus further includes an extension module.

The extension module is configured to, before each TB or between every two TBs, extend the length of the gap. The length of the gap includes at least one of the following: 0, 16, 32, 64, 128, 512, 1024 or 2048.

FIG. 5 is a diagram illustrating the structure of a device according to an embodiment of the present application. As shown in FIG. 5, the device provided in the present application includes a processor 310 and a memory 320. The number of processors 310 in the device may be one or more, and FIG. 5 is illustrated by using an example in which there is one processor 310. The number of memories 320 in the device may be one or more, and FIG. 5 is illustrated by using an example in which there is one memory 320. The processor 310 and the memory 320 of the device may be connected by a bus or in other manners, and the connection by a bus is taken as an example in FIG. 5. In this embodiment, the device is a base station or a UE.

The memory 320, as a computer-readable storage medium, may be configured to store software programs and computer executable programs and modules such as program instructions/modules corresponding to the equipment in any embodiment of the present application (such as a determination module in the scheduling apparatus). The memory 320 may include a storage program region and a storage data region, where the storage program region may store an operating system and an application program required by at least one function, and the storage data region may store data created depending on the use of the device. In addition, the memory 320 may include a high-speed random access memory, and may also include a nonvolatile memory, such as at least one click memory, flash memory or another nonvolatile solid-state memory. In some examples, the memory 320 may include memories which are remotely disposed relative to the processor 310 and these remote memories may be connected to the device via a network. Examples of the preceding network include, but are not limited to, the Internet, an intranet, a local area network, a mobile communication network, and a combination thereof.

The device provided above may be configured to execute the scheduling method provided by any embodiment described above, and has corresponding functions and effects.

The embodiments of the present application further provide a storage medium including a computer-executable instruction. The computer-executable instruction is configured to perform a scheduling method when the computer processor is performed. The method includes the following: in the case where multiple TBs are scheduled in one PDCCH, the order of the TBs and the narrowband position of a TB are determined according to the predefined rule. The predefined rule includes at least one of the following: a predefined frequency hopping rule or a predefined interleaving rule.

The term user equipment encompasses any suitable type of wireless user equipment, such as a mobile phone, a portable data processing apparatus, a portable web browser or an onboard mobile station.

In general, multiple embodiments of the present application may be implemented in hardware, a dedicated circuit, software, logic or any combination thereof. For example, some aspects may be implemented in hardware while other aspects may be implemented in firmware or software that may be performed by a controller, a microprocessor or other computing apparatuses, though the present application is not limited thereto.

The embodiments of the present application may be implemented by computer program instructions executed by a data processor of a mobile apparatus, for example, in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. Computer-readable media may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A scheduling method, comprising:
in a case where multiple transport blocks (TBs) are scheduled in one physical downlink control channel (PDCCH), determining an order of the multiple TBs and a narrowband position of each TB of the multiple TBs according to a predefined rule, wherein the predefined rule comprises at least one of a predefined frequency hopping rule or a predefined interleaving rule;
wherein scheduling information used for scheduling the multiple TBs comprises one of the following: first joint indication information comprising a hybrid automatic repeat request (HARQ) process identifier (ID), a number of TBs and new data indication (NDI) information; second joint indication information comprising a HARQ process ID, a number of TBs, NDI information, a redundancy version (RV) and frequency hopping (FH) information, wherein the FH information comprises at least one of the frequency hopping information or extension information of a modulation and coding scheme (MCS) used when a 64 quadrature amplitude modulation (QAM) is supported; or third joint indication information comprising a HARQ process ID, a number of TBs, NDI information and RV;
wherein when Time Division Dual (TDD) uplink/downlink configuration 6 is supported:
a maximum number of HARQ processes scheduled in an uplink is 6, 10 bits are used for indicating the first joint indication information, and 3 bits are used for indicating the RV and the FH information; or
a maximum number of HARQ processes scheduled in an uplink is 6 and 10 bits are used for indicating the first joint indication information; or
a maximum number of HARQ processes scheduled in an uplink is 6, and 12 bits are used for indicating the third joint indication information; and
wherein when the 12 bits are used for indicating the third joint indication information:
the number of TBs is 1, 3, 4, 5 or 6, 2 bits are used for indicating the RV; or
in a case where the number of TBs is 2, each TB uses 1 bit for indicating the RV.

2. The method according to claim 1, wherein the predefined rule is the predefined interleaving rule, and wherein determining the order of the multiple TB s according to the predefined rule comprises:
determining the order of the multiple TBs according to an interleaving block index.

3. The method according to claim 2, wherein determining the order of the multiple TBs according to the interleaving block index comprises one of the following:

determining that relative positions of all TBs in an interleaving block with an index number c are obtained by shifting relative positions of all TB s in an interleaving block with an index number c−1; or
determining that relative positions of all TBs in an interleaving block with an index number c are obtained by shifting relative positions of all TB s in an interleaving block with an index number 0;
wherein the shifting refers to a left shift or a right shift of a relative position of each TB in an interleaving block, a unit of the shifting refers to a position unit of the shifting, and c is an integer greater than or equal to 0.

4. The method according to claim 3, wherein the unit of the shifting comprises one TB, two TBs, or a number of TBs occupied in one narrowband.

5. The method according to claim 3, wherein the relative positions of all the TBs in the interleaving block with the index number c being obtained by shifting the relative positions of all the TBs in the interleaving block with the index number c−1 comprises:

$$X_{c,r} = \mod(X_{c-1,r} \pm c*\text{shift}, N_{TB}),$$

wherein $X_{c-1,r}$ denotes a position number of a TB with a number r in the interleaving block with the index number c−1, $X_{c,r}$ denotes a position of a TB with a number r in the interleaving block with the index number c, shift denotes an offset value of the shifting, and $N_{TB}$ denotes a number of scheduled TBs.

6. The method according to claim 3, wherein the relative positions of all the TB s in the interleaving block with the index number c being obtained by shifting the relative positions of all the TBs in the interleaving block with the index number 0 comprises:

$$r'_c = \mod(r \pm c*\text{shift}, N_{TB}),$$

wherein c denotes an index number of an interleaving block, r denotes a number of a TB in a first interleaving block, r also denotes a position number of the TB in the first interleaving block, $N_{TB}$ denotes a number of scheduled TBs, $r'_c$ denotes a position of a TB with an initial number r in the interleaving block with the index number c, and shift denotes an offset value of the shifting.

7. The method according to claim 1, wherein the predefined rule is the predefined interleaving rule, and wherein determining the order of the multiple TB s according to the predefined rule satisfies at least one of following conditions:
in a case where each TB is spanned in only a unique narrowband, relative positions of all TBs in an interleaving block are shifted according to the predefined rule;
in a case where a total number of narrowbands is 4 and each TB is spanned in 2 narrowbands, relative positions of all TBs in an interleaving block are shifted according to the predefined rule;
in a case where each TB is not spanned in all configured narrowbands, relative positions of all TBs in an interleaving block are shifted according to the predefined rule;
in a case where an interleaving granularity, a frequency hopping granularity, a number of scheduled TBs and a number of frequency hopping narrowbands satisfy a following relationship $G \leq Y_{ch}$, $N_{TB}*G/(N_{band}*Y_{ch})=n$, n=1,2,3,4, relative positions of all TBs in an interleaving block are shifted according to the predefined rule, wherein G denotes the interleaving granularity, $Y_{ch}$ denotes the frequency hopping granularity, $N_{TB}$ denotes the number of the scheduled TBs, and $N_{band}$ denotes the number of the frequency hopping narrowbands; or in a case where an interleaving granularity, a frequency hopping granularity, a number of scheduled TBs, and a number of frequency hopping narrowbands satisfy a following relationship: $N_{TB}*G/(N_{band}*Y_{ch})=n$, n=1/2, 1,2,3,4, relative positions of all TBs in an interleaving block are shifted according to the predefined rule, wherein G denotes the interleaving granularity, $Y_{ch}$ denotes the frequency hopping granularity, $N_{TB}$ denotes the number of the scheduled TBs, and $N_{band}$ denotes the number of the frequency hopping narrowbands.

8. The method according to claim 1, wherein the predefined rule is the predefined frequency hopping rule, and a configuration manner of a frequency hopping granularity comprises one of the following: a predefined value or a downlink control information (DCI) indication value; and wherein the configuration manner of the frequency hopping granularity is the DCI indication value; and wherein the DCI indication value uses 2 bits for indication, and the 2 bits are used for indicating that frequency hopping is not enabled or indicating 3 values of the frequency hopping granularity; or the DCI indication value uses 1 bit for indication, and the 1 bit is used for indicating 2 values of the frequency hopping granularity; or wherein the configuration manner of the frequency hopping granularity is the predefined value, the predefined value comprises at least one of {1, 2, 4, 8}, and a unit of the frequency hopping granularity comprises one of the following:
one interleaving block;
a product of an interleaving granularity and a number of slots or subframes occupied by each of resource units (RUs), or a product of a number of RUs and a number of slots or subframes occupied by each of the RUs;
a product of number of RUs allocated to a transmission block and a number of slots or subframes occupied by each of the RUs;
one RU; or
one subframe.

9. The method according to claim 1, wherein in a case where a time division duplex (TDD) uplink/downlink configuration 6 is supported, a maximum number of HARQ processes scheduled in a downlink is 8, and 13 bits are used for indicating the second joint indication information; and wherein in a case where a number of HARQ processes scheduled in the downlink is 8, the RV comprises 1 bit and is shared for the TBs, and the FH information comprises 1 bit for indicating whether frequency hopping is enabled; or i a case where a number of HARQ processes scheduled in the downlink is 2, each TB uses 1 bit for indicating the RV or 1 bit for indicating the FH information.

10. The method according to claim 1, wherein in a case where TDD uplink/downlink configuration 4 is supported, a maximum number of HARQ processes scheduled in an uplink is 2, 3 bits are used for indicating the first joint indication information, and 1 bit is used for indicating the FH information, or each TB uses corresponding 2 bits for indicating the RV; or in a case where TDD uplink/downlink configuration 4 is supported, a maximum number of HARQ processes scheduled in an uplink is 2, 8 bits or 6 bits are used for indicating the second joint indication information, or each TB uses 2 bits for indicating the RV; or in a case where TDD uplink/downlink configuration 4 is supported, a maximum number of HARQ processes scheduled in an uplink is 2, 7 bits or 5 bits are used for indicating the second joint indication information, or each TB uses 2 bits for indicating the RV.

11. The method according to claim 1, wherein in a case where TDD uplink/downlink configuration 3 is supported, a maximum number of HARQ processes scheduled in an uplink is 3, and 5 bits are used for indicating the first joint indication information;

in a case where TDD uplink/downlink configuration 3 is supported, a maximum number of HARQ processes scheduled in an uplink is 3, and 11 bits are used for indicating the second joint indication information; or in a case where TDD uplink/downlink configuration 3 is supported, a maximum number of HARQ processes scheduled in an uplink is 3, 10 bits are used for indicating the third joint indication information, or each TB uses 2 bits for indicating the RV.

12. The method according to claim 1, wherein in a case where TDD uplink/downlink configuration 1 is supported, a maximum number of HARQ processes scheduled in a downlink is 9, and 13 bits are used for indicating the second joint indication information.

13. The method according to claim 1, wherein in a case where TDD uplink/downlink configuration 1 is supported, a maximum number of HARQ processes scheduled in an uplink is 4, and 7 bits are used for jointly indicating the third joint indication information;

in a case where TDD uplink/downlink configuration 1 is supported, a maximum number of HARQ processes scheduled in an uplink is 4, and 11 bits are used for indicating the second joint indication information; or in a case where TDD uplink/downlink configuration 1 is supported, a maximum number of HARQ processes scheduled in an uplink is 4, and 10 bits are used for jointly indicating the third joint indication information.

14. The method according to claim 1, wherein in a case where TDD uplink/downlink configuration 0 is supported, a maximum number of HARQ processes scheduled in a downlink is 6, and 10 bits are used for jointly indicating the first joint indication information.

15. The method according to claim 1, wherein
in a case where TDD uplink/downlink configuration 0 is supported, a maximum number of HARQ processes scheduled in an uplink is 7, and 12 bits are used for jointly indicating the first joint indication information;

in a case where TDD uplink/downlink configuration 0 is supported, a maximum number of HARQ processes scheduled in an uplink is 7, and 13 bits are used for jointly indicating the second joint indication information; or in a case where the TDD uplink/downlink configuration 0 is supported, a maximum number of HARQ processes scheduled in an uplink is 7, and 12 bits are used for jointly indicating the third joint indication information.

16. The method according to claim 1, wherein in the case where the multiple TBs are scheduled in the one PDCCH, the method further comprises:
indicating a first preset bit value through DCI, wherein the first preset bit value is used for indicating a bundling size for TB s;
indicating a second preset bit value through DCI, wherein the second preset bit value is used for indicating a bundling size for TBs or indicating that bundling is not enabled; or indicating a third preset bit value through DCI, wherein the third preset bit value is used for indicating a manner of TB s bundling;
wherein the manner of TBs bundling comprises one of the following: consecutive TB bundling or discrete TB bundling, wherein the consecutive TB bundling refers to that N bundled TBs are consecutive in a time domain, and the discrete TB bundling refers to that N bundled TBs are inconsecutive in the time domain.

17. The method according to claim 1, further comprising:
determining that a gap, before each TB or between every two TBs, comprises one of following lengths: 16 subframes, 32 subframes, 64 subframes, 128 subframes, 512subframes, 1024 subframes or 2048 subframes.

18. A device, comprising a memory and at least one processor, wherein
the memory is configured to store at least one program; and
when executed by the at least one processor, the at least one program causes the at least one processor to perform:
in a case where multiple transport blocks (TBs) are scheduled in one physical downlink control channel (PDCCH), determining an order of the multiple TBs and a narrowband position of each TB of the multiple TBs according to a predefined rule, wherein the predefined rule comprises at least one of a predefined frequency hopping rule or a predefined interleaving rule;
wherein scheduling information used for scheduling the multiple TBs comprises one of the following: first joint indication information comprising a hybrid automatic repeat request (HARQ) process identifier (ID), a number of TBs and new data indication (NDI) information; second joint indication information comprising a HARQ process ID, a number of TBs, NDI information, a redundancy version (RV) and frequency hopping (FH) information, wherein the FH information comprises at least one of the frequency hopping information or extension information of a modulation and coding scheme (MCS) used when a 64 quadrature amplitude modulation (QAM) is supported; or third joint indication information comprising a HARQ process ID, a number of TBs, NDI information and RV;
wherein when TDD uplink/downlink configuration 6 is supported:
a maximum number of HARQ processes scheduled in an uplink is 6, 10 bits are used for indicating the first joint indication information, and 3 bits are used for indicating the RV and the FH information; or
a maximum number of HARQ processes scheduled in an uplink is 6 and 10 bits are used for indicating the first joint indication information; or
a maximum number of HARQ processes scheduled in an uplink is 6, and 12 bits are used for indicating the third joint indication information; and
wherein when the 12 bits are used for indicating the third joint indication information:
the number of TBs is 1, 3, 4, 5 or 6, 2 bits are used for indicating the RV; or in a case where the number of TBs is 2, each TB uses 1 bit for indicating the RV.

\* \* \* \* \*